US011540100B2

(12) United States Patent
Baek et al.

(10) Patent No.: US 11,540,100 B2
(45) Date of Patent: Dec. 27, 2022

(54) METHOD AND APPARATUS FOR COMMUNICATION OF TERMINAL IN MOBILE COMMUNICATION SYSTEM

(71) Applicant: Samsung Electronics Co., Ltd., Suwon-si (KR)

(72) Inventors: Youngkyo Baek, Seoul (KR); Sung Hwan Won, Seoul (KR); Sunghoon Kim, Suwon-si (KR); Jinkyu Han, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 59 days.

(21) Appl. No.: 17/135,348

(22) Filed: Dec. 28, 2020

(65) Prior Publication Data
US 2021/0120389 A1    Apr. 22, 2021

Related U.S. Application Data

(63) Continuation of application No. 16/068,810, filed as application No. PCT/KR2017/000628 on Jan. 18, 2017, now Pat. No. 10,880,710.
(Continued)

(51) Int. Cl.
H04W 4/00 (2018.01)
H04W 4/50 (2018.01)
(Continued)

(52) U.S. Cl.
CPC .......... H04W 4/50 (2018.02); H04L 65/1016 (2013.01); H04L 65/1063 (2013.01); H04W 4/08 (2013.01); H04W 4/70 (2018.02); H04W 24/10 (2013.01)

(58) Field of Classification Search
CPC .......... H04L 65/1016; H04L 65/1063; H04W 24/10; H04W 4/08; H04W 4/50;
(Continued)

(56) References Cited

U.S. PATENT DOCUMENTS 8,989,729 B2    3/2015  Barclay et al.
9,668,236 B2    5/2017  Ryu et al.
(Continued)

FOREIGN PATENT DOCUMENTS

CN         101631303 A      1/2010
WO         2014/061911 A1   4/2014
WO     WO-2014061911 A1 *   4/2014   .............. H04W 4/70

OTHER PUBLICATIONS

Chinese Office Action dated Sep. 30, 2020, issued in Chinese Application No. 20178007147.5.
(Continued)

Primary Examiner — Phuc H Tran
(74) Attorney, Agent, or Firm — Jefferson IP Law, LLP

(57) ABSTRACT

The disclosure relates to a communication technique and a system thereof for fusing, with IoT technology, a 5G communication system for supporting a higher data transmission rate than a 4G system. The disclosure may be applied to intelligent services (such as smart homes, smart buildings, smart cities, smart cars or connected cars, health care, digital education, retail business, and security and safety related services, etc.) on the basis of 5G communication technology and IoT related technology. The disclosure may provide a method for setting the monitoring of an application server (AS), the method comprising the steps of: transmitting, to a service capability exposure function (SCEF), a first message which comprises information on an identifier, which indicates a group including a plurality of terminals, and a waiting time and instructs to report monitoring information on the group including a plurality of terminals; and receiv-
(Continued)

ing, from the SCEF, a second message comprising the monitoring information on the group of a plurality of terminals.

18 Claims, 22 Drawing Sheets

Related U.S. Application Data

(60) Provisional application No. 62/280,101, filed on Jan. 18, 2016.

(51) Int. Cl.
*H04W 24/10* (2009.01)
*H04L 65/1063* (2022.01)
*H04W 4/08* (2009.01)
*H04W 4/70* (2018.01)
*H04L 65/1016* (2022.01)

(58) Field of Classification Search
CPC ..... H04W 4/70; H04N 19/119; H04N 19/174; H04N 19/176; H04N 19/50; H04N 19/96
See application file for complete search history.

(56) References Cited

U.S. PATENT DOCUMENTS

| | | | |
|---|---|---|---|
| 9,930,516 B2 | 3/2018 | Won et al. | |
| 10,225,768 B2 | 3/2019 | Ryu et al. | |
| 10,306,591 B2 | 5/2019 | Starsinic et al. | |
| 2010/0013634 A1 | 1/2010 | Kanna | |
| 2013/0117447 A1 | 5/2013 | Yoshida | |
| 2015/0249900 A1 | 9/2015 | Kim et al. | |
| 2015/0289078 A1* | 10/2015 | Kim | H04W 8/02 455/422.1 |
| 2016/0007316 A1 | 1/2016 | Vaidya et al. | |
| 2016/0142860 A1* | 5/2016 | Kim | H04W 80/02 455/435.1 |
| 2017/0195822 A1 | 7/2017 | Wafta et al. | |
| 2017/0339534 A1 | 11/2017 | Bhalla | |
| 2018/0054799 A1 | 2/2018 | Starsinic et al. | |

OTHER PUBLICATIONS

European Office Action dated Jul. 12, 2019, issued in European Patent Application No. 177 41658.3.
3rd Generation Partnership Project; Technical Specification Group Services and System Aspects; Architecture enhancements to facilitate communications with packet data networks and applications (Release 13), 3GPP Standard; 3GPP TS 23.682, 3rd Generation Partnership Project (3GPP), Mobile Competence Centre; 650, Route Des Lucioles ; F-06921 Sophia-Antipolis Cedex; France, vol. SA WG2, No. V13.4.0, Dec. 15, 2015 (Dec. 15, 2015), oa!les 1-81, XP051046488, [retrieved on Dec. 15, 2015.
Samsung: "New solution: Group management via HSS", 3GPP Draft; S2-160436, 3rd Generation Partnership Project (3GPP), Mobile Competence Centre ; 650, Route Des Lucioles F-06921 Sophia-Antipolis Cedex; France, vol. SA WG2, No. Saint Kitts, KN; Jan. 25, 2016-Jan. 29, 2016 Jan. 17, 2016 (Jan. 17, 2016), XP051060076, Retrieved from the Internet: URL:http://www.3gpp.org/ftp/Meetings 3GPP SYNC/5A2/Docs/.
European Search Report dated Oct. 5, 2018, issued in European Patent Application No. 17741658.3.
Samsung, "New SID: Study on Enhancements in the Network Capability Exposure of Group-based Services", S2-154062, 3GPP TSG-SA WG2 Meeting #112, Anaheim, CA USA Nov. 12, 2015.
3GPP TSG CT4, "LS on Clmification on Requirements for MONTE", S2-153412, 3GPP SG-SA WG2 Meeting #1 11, Chengdu, PK China, Oct. 18, 2015.
Huawei et al "Using Individual SCEF Reference ID dming the Group-based Monitoring Event Configuration Procedure", S2-165613, 3GPP TSG-SA WG2 Meeting #117, Kaohsiung city, Taiwan, Oct. 11, 2016.
3GPP TS 23.468 V16.0.0 (Jul. 2020) 3rd Generation Partnership Project; Technical Specification Group Services and System Aspects; Group Communication System Enablers for LTE (GCSE_LTE); Stage 2 (Release 16), Jul. 9, 2020.
3GPP TS 23.246 V16.1.0 (Sep. 2019) 3rd Generation Partnership Project; Technical Specification Group Services and System Aspects; Multimedia Broadcast/Multicast Service (MBMS); Architecture and functional description (Release 16), Sep. 24, 2019.
European Communication dated Feb. 8, 2021, issued in European Application No. 17741658.3.

\* cited by examiner

METHOD AND APPARATUS FOR COMMUNICATION OF TERMINAL IN MOBILE COMMUNICATION SYSTEM

CROSS-REFERENCE TO RELATED APPLICATION(S)

This application is a continuation application of prior application Ser. No. 16/068,810 filed on Jul. 9, 2018, which has issued as U.S. Pat. No. 10,880,710 on Dec. 29, 2020; and which is a U.S. National Stage Application under 35 U.S.C. § 371 of International Application No. PCT/KR2017/000628 filed on Jan. 18, 2017, which is based on and claims priority under 35 U.S.C. § 119(e) of U.S. Provisional Application No. 62/280,101 filed on Jan. 18, 2016, the disclosure of each of which is incorporated by reference herein in its entirety.

TECHNICAL FIELD

An embodiment of the present invention relates to a method and apparatus for communication of a terminal in a mobile communication system. In addition, an embodiment of the present invention relates to a method and apparatus for group terminal management. In addition, an embodiment of the present invention relates to a method and apparatus for efficiently controlling a plurality of terminals. In addition, an embodiment of the present invention relates to a method and apparatus for communication via a path suitable for a service characteristic. In addition, an embodiment of the present invention relates to a method and apparatus for communication of service contents distributed near a user. In addition, an embodiment of the present invention relates to a method and apparatus for transmitting and receiving data at a terminal connected to a plurality of third-party servers. In addition, an embodiment of the present invention relates to a method and apparatus for managing a bearer when a cellular Internet of things (IoT) terminal uses a telephone service.

BACKGROUND ART

To meet the demand for wireless data traffic having increased since deployment of $4^{th}$ generation (4G) communication systems, efforts have been made to develop an improved $5^{th}$ generation (5G or pre-5G) communication system. Therefore, the 5G or pre-5G communication system is also called a 'Beyond 4G Network' or a 'Post long term evolution (LTE) System'. The 5G communication system is considered to be implemented in higher frequency (mm-Wave) bands, e.g., 60 GHz bands, so as to accomplish higher data rates. To decrease the propagation loss of radio waves and increase the transmission distance, various techniques such as beamforming, massive multiple-input multiple-output (massive MIMO), full dimensional MIMO (FD-MIMO), an array antenna, analog beamforming, and a large scale antenna are discussed in the 5G communication system. Also, in the 5G communication system, the development for system network improvement is underway based on an advanced small cell, a cloud radio access network (cloud RAN), an ultra-dense network, device-to-device (D2D) communication, wireless backhaul, a moving network, cooperative communication, coordinated multi-points (CoMP), reception-end interference cancellation, and the like. Further, in the 5G system, hybrid frequency shift keying (FSK) and quadrature amplitude modulation (QAM) (FQAM) and sliding window superposition coding (SWSC) have been developed as advanced coding modulation (ACM) schemes, and filter bank multi carrier (FBMC), non-orthogonal multiple access (NOMA), and sparse code multiple access (SCMA) have been developed as advanced access technologies.

Meanwhile, the Internet, which is a human centered connectivity network where humans generate and consume information, is now evolving to the Internet of things (IoT) where distributed entities, such as things, exchange and process information without human intervention. Further, the Internet of everything (IoE), which is a combination of IoT technology and big data processing technology through connection with a cloud server, has emerged. As technology elements, such as sensing technology, wired/wireless communication and network infrastructure, service interface technology, and security technology, have been demanded for IoT implementation, a sensor network, machine-to-machine (M2M) communication, machine type communication (MTC), and so forth have been recently researched. Such an IoT environment may provide intelligent Internet technology services that create a new value to human life by collecting and analyzing data generated among connected things. The IoT may be applied to a variety of fields including smart home, smart building, smart city, smart car or connected car, smart grid, health care, smart appliances, advanced medical service, etc. through convergence and combination between existing information technology (IT) and various industrial applications.

In line with this, various attempts have been made to apply the 5G communication system to the IoT network. For example, technologies such as a sensor network, machine type communication (MTC), and machine-to-machine (M2M) communication are being implemented on the basis of 5G communication technologies such as beamforming, MIMO, and an array antenna. The use of a cloud radio access network (cloud RAN) for big data processing technology is one example of convergence between the 5G technology and the IoT technology.

The IoT technology is in the spotlight in various fields, and communication operators and vendors are developing various applications and systems using IoT. Among various IoT solutions, the cellular IoT (hereinafter referred to as 'CIoT') which utilizes a licensed frequency band allocated to the cellular system has lately attracted attention. This is because the cellular system can provide relatively reliable communication as compared to the non-cellular system and thus can provide a stable service. In connection with the CIoT, standardization activities such as evolved machine type communication (eMTC) and global system for mobile communications enhanced data rates for global system for mobile communication (GSM) enhanced data rates for GSM (EDGE) radio access network (GERAN) CIoT are actively underway, and needs of communication operators often have a decisive influence on standard decisions due to the nature of standardization activities.

Advanced communication technology enables communication between all things as well as between users, and therefore this is called IoT. For example, a user can have various types of electronic devices, and all of these electronic devices can be connected to each other through mobile communication, short-range communication, various sensors, etc. to provide more convenient functions to the user while allowing an efficient inter-device control. These electronic devices may be referred to as IoT devices or IoT terminals. Another example of IoT devices is measuring equipment that measures the electricity usage, water usage, etc. of a building and delivers a measurement value over the network. As still another example, IoT devices for public safety may be installed in public or remote places to monitor safety situations, and these devices may notify an event status through the network when a certain event occurs. As yet another example, home appliances may have a network access function and thereby report its state or perform a specific operation in response to a device trigger command from a user.

The IoT device includes a mobile communication module such as LTE or a short-range communication module such as Bluetooth, WiFi, Zigbee, or near-field communication (NFC).

An LTE terminal may operate at the LTE carrier frequency, and may operate in the industrial, scientific, and medical (ISM) band.

DISCLOSURE OF INVENTION

Technical Problem

It is an object of the present invention to provide a method and apparatus for an enhanced mobile communication service.

Solution to Problem

According to an embodiment of the present invention, a monitoring configuration method of an application server (AS) may comprise steps of transmitting, to a service capability exposure function (SCEF), a first message including an identifier indicating a group including a plurality of terminals and information on a wait time and information indicating to report monitoring information for the group; and receiving, from the SCEF, a second message including the monitoring information for the group.

In addition, according to an embodiment of the present invention, an AS may comprise a transceiver transmitting and receiving signals; and a controller controlling to transmit, to SCEF, a first message including an identifier indicating a group including a plurality of terminals and information on a wait time and instructs to report monitoring information for the group, and controlling to receive, from the SCEF, a second message including the monitoring information for the group.

In addition, according to an embodiment of the present invention, a monitoring configuration method of a SCEF may comprise steps of receiving, from an AS, a first message including a group identifier indicating a group of a plurality of terminals and information on a wait time and information indicating to report monitoring information for the group; transmitting, to a home subscriber server (HSS), a second message including an identifier identifying connection between the SCEF and the HSS, the group identifier, and the information on the wait time; receiving a third message including the monitoring information for the group from the HSS; and transmitting a fourth message including the monitoring information for the group to the AS.

In addition, according to an embodiment of the present invention, a SCEF may comprise a transceiver transmitting and receiving signals; and a controller controlling to receive, from an AS, a first message including a group identifier indicating a group of a plurality of terminals and information on a wait time and instructs to report monitoring information for the group, controlling to transmit, to a HSS, a second message including an identifier identifying connection between the SCEF and the HSS, the group identifier, and the information on the wait time, controlling to receive a third message including the monitoring information for the group from the HSS, and controlling to transmit a fourth message including the monitoring information for the group to the AS.

In addition, according to an embodiment of the present invention, a monitoring configuration method of an HSS may comprise steps of receiving, from a SCEF, a first message including an identifier identifying connection between the HSS and the SCEF, a group identifier indicating a group of a plurality of terminals, and information about a wait time; transmitting a second message configuring a monitoring type to an entity of managing mobility of the plurality of terminals; receiving a third message including monitoring information corresponding to the monitoring type from the entity of managing mobility; and transmitting a fourth message including the monitoring information to the SCEF.

In addition, according to an embodiment of the present invention, an HSS may comprise a transceiver transmitting and receiving signals; and a controller controlling to receive, from a SCEF, a first message including an identifier identifying connection between the HSS and the SCEF, a group identifier indicating a group of a plurality of terminals, and information on a wait time, controlling to transmit a second message configuring a monitoring type to an entity of managing mobility of the plurality of terminals, controlling to receive a third message including monitoring information corresponding to the monitoring type from the entity of managing mobility, and controlling to transmit a fourth message including the monitoring information to the SCEF.

Technical problems and solutions of the present invention are not limited to those mentioned above. Even though not mentioned above, other technical problems and solutions will be apparent to those skilled in the art from the description below.

Advantageous Effects of Invention

According to an embodiment of the present invention, it is possible to provide a method and apparatus for group terminal management. In addition, according to an embodiment of the present invention, it is possible to provide a method and apparatus for efficiently controlling a plurality of terminals. In addition, according to an embodiment of the present invention, it is possible to provide a method and apparatus for communication via a path suitable for a service characteristic.

In addition, according to an embodiment of the present invention, it is possible to provide a method and apparatus for communication of service contents distributed near a user. In addition, according to an embodiment of the present invention, it is possible to provide a method and apparatus for transmitting and receiving data at a terminal connected to a plurality of third-party servers. Further, according to an embodiment of the present invention, it is possible to provide a method and apparatus for managing a bearer when a cellular Internet of things (CIoT) terminal uses a telephone service.

MODE FOR THE INVENTION

Figure 1:
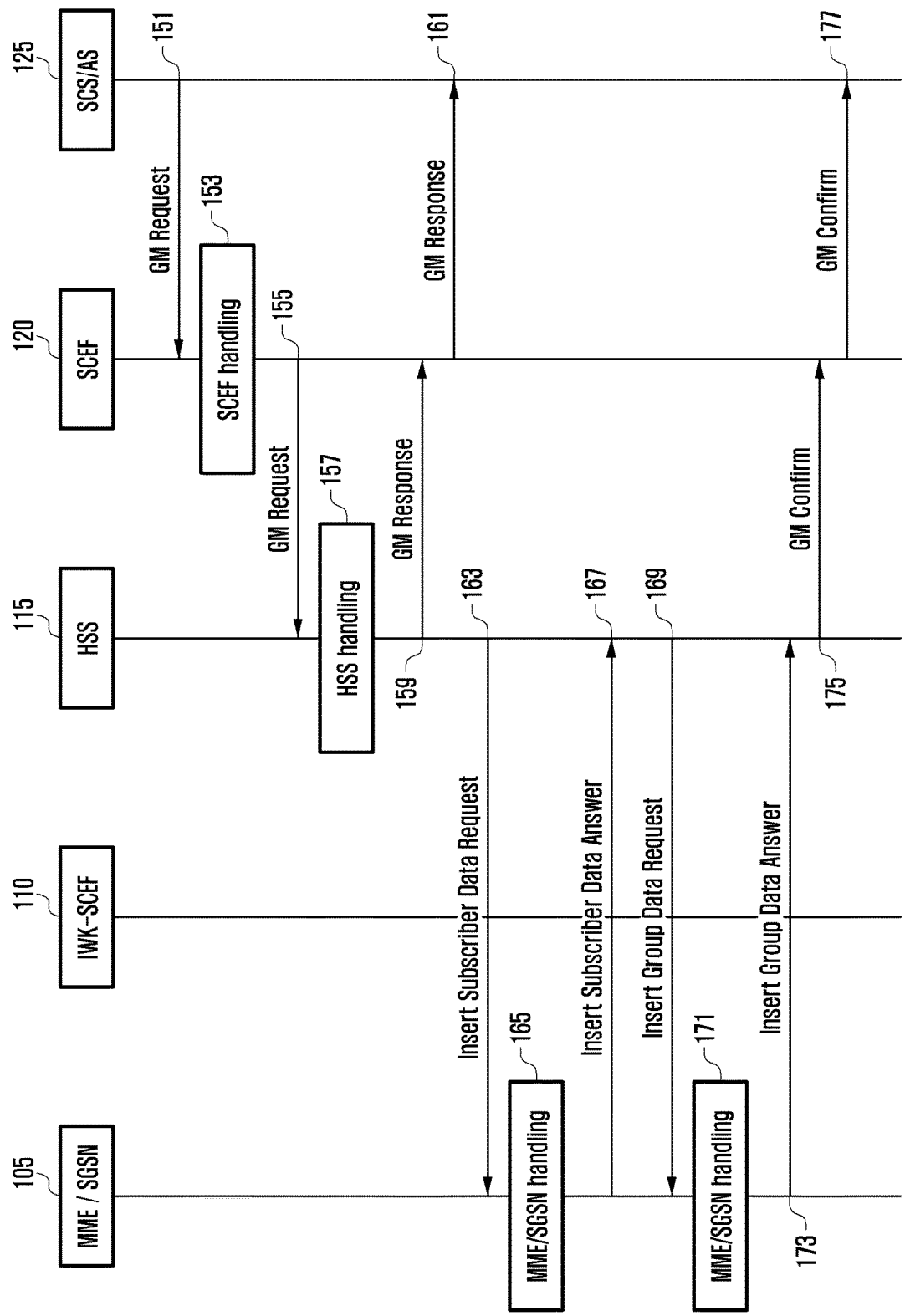
FIG. 1 is a diagram illustrating a procedure between an services capability server (SCS)/application server (AS), a service capability exposure function (SCEF), a home subscriber server (HSS), and a mobility management entity (MME)/serving general packet radio service (GPRS) support node (SGSN) (MME/SGSN) in order to create a group for managing a terminal in an embodiment of the present invention.

Hereinafter, embodiments of the present invention will be described with reference to the accompanying drawings.

In the following description of embodiments, descriptions of techniques that are well known in the art and not directly related to the present invention are omitted. This is to clearly convey the subject matter of the present invention by omitting any unnecessary explanation.

For the same reason, some elements in the drawings are exaggerated, omitted, or schematically illustrated. Also, the size of each element does not entirely reflect the actual size. In the drawings, the same or corresponding elements are denoted by the same reference numerals.

The advantages and features of the present invention and the manner of achieving them will become apparent with reference to the embodiments described in detail below and with reference to the accompanying drawings. The present invention may, however, be embodied in many different forms and should not be construed as being limited to the embodiments set forth herein. Rather, these embodiments are provided so that this invention will be thorough and complete and will fully convey the scope of the invention to those skilled in the art. To fully disclose the scope of the invention to those skilled in the art, the invention is only defined by the scope of claims.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a field programmable gate array (FPGA) or application specific integrated circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and modules. In addition, the components and units may be implemented to operate one or more central processing units (CPUs) in a device or a secure multimedia card.

Although embodiments of the present invention will be described hereinafter by mainly targeting long-term evolution (LTE) and evolved packet core (EPC), which are a radio access network (RAN) and a core network (CN) defined as standards by the 3rd generation partnership project (3GPP), the essential concept of the present invention may be also applied to any other communication system having a similar technical background without departing from the scope of this invention as will be apparent to those skilled in the art.

For convenience of explanation, some terms and names defined in standards of the 3rd generation partnership project long term evolution (3GPP LTE) may be used. However, the present invention is not limited by such terms and names, and can be equally applied to systems conforming to other standards.

An LTE terminal and an Internet of things (IoT) terminal to be used hereinafter refer to a mobile terminal, also referred to as user equipment (UE), capable of wireless communication. For example, the LTE terminal and the IoT terminal may be a personal digital assistant (PDA), a smart phone, a mobile phone, a tablet computer, a notebook, or the like which includes a communication function. In addition, the LTE terminal and the IoT terminal may be a measuring device for checking water usage, electricity usage, or temperature, an alarm device, such as a fire alarm or an earthquake alarm, for recognizing and reporting a specific situation, or home appliances, such as an air conditioner, a refrigerator, an air purifier, a boiler, or a vacuum cleaner, having a communication function. All things capable of communication as well as the above-mentioned types will be referred to as the IoT terminals in the present invention. Among the IoT terminals, a terminal using the cellular network will be referred to as a cellular Internet of things (CIoT) terminal. The CIoT terminal may refer to a terminal that transmits a small amount of data in the LTE network. In the present invention, an apparatus, function, and operation for a CIoT service include an apparatus, function, and operation for small data transmission in the LTE network. IoT data may refer to data sent by the IoT terminal or a small amount of data sent by any type of terminal.

First Embodiment

A first embodiment of the present invention relates to a method for creating and managing a group of terminals and to an apparatus for performing the method.

In the first embodiment, a services capability server (SCS)/application server (AS) refers to a 3rd party application server. A service capability exposure function (SCEF) performs a function of connecting the SCS/AS to an evolved packet system (EPS) network and is located in a trusted domain. The SCEF is connected to a home subscriber server (HSS) and receives information about terminals (UEs). The SCEF is connected to a mobility management entity (MME) via the HSS and can exchange information. There are a UE-MME connection, an MME-SCEF connection and an SCEF-SCS/AS connection, and information about UEs may be exchanged through these connections.

The first embodiment of the present invention proposes a method and an apparatus for creating a group for management of several UEs and managing this group.

The HSS may support a group management request. If the HSS does not support the group management request, the group management request sent by the SCS/AS is rejected by the HSS or by the SCEF which knows that the HSS does not support the group management request.

Even if the HSS supports the group management request, the following cases may occur. A certain relevant CN node may perform group-based monitoring/communication pattern provisioning and group-specific NAS (non-access stratum) level congestion control, and other relevant CN node may not perform at least one of group-based monitoring/communication pattern provisioning and group-specific NAS (non-access stratum) level congestion control.

FIG. 1 is a diagram illustrating a procedure between an SCS/AS, an SCEF, an HSS, and a mobility management entity (MME)/serving general packet radio service (GPRS) support node (SGSN) (MME/SGSN) in order to create a group for managing a terminal (i.e., UE) in an embodiment of the present invention.

Referring to FIG. 1, a wireless communication system may include an MME/SGSN 105, an interworking SCEF (IWK-SCEF) 110, an HSS 115, an SCEF 120, and an SCS/AS 125.

At operation 151, the SCS/AS 125 sends a group management request message to the SCEF 120. This message includes at least one of an SCS/AS identifier (ID), an SCS/AS reference ID for identifying a connection between the SCS/AS and the SCEF, a group management type, and an external group ID for indicating the ID of an external group to which the UE belongs. The group management type may include group creation/modification/removal. The external group ID may be associated with an external ID for identifying the UE or a mobile station international subscriber directory number (MSISDN) which is a mobile communication number of the UE. In addition, the above message may include an indication of member addition/removal with respect to the external ID or the MSISDN. Also, the group management request message may include an indication that indicates whether to configure group management related data only up to the HSS 115 or up to the MME 105.

If there are two or more group management request messages, a relative priority scheme for deciding which message will be processed first may be used, and this may comply with setting values of the SCEF 120.

If the group management type indicates the group creation, the external group ID should be associated with the external IDs or MSISDNs of the UEs to be included in a new group identified by the external group ID. If the group management type indicates the group modification, the external group ID should be associated with the external IDs or MSISDNs of the UEs each of which is to be added to or removed from the existing group identified by the external group ID. Also, each of the external IDs or MSISDNs should be associated with the member addition/removal indication. If the group management type indicates the group removal, the external group ID should not be associated with any external ID or MSISDN, and the external group ID may indicate the existing group to be removed.

Meanwhile, the group management request message may include at least one of the external ID and the MSNID, which can be used by the HSS 115 to manage a group ID list.

Using the external ID or MSN ID included in the group management request, the HSS can easily find the UE to be removed from the group list.

At operation 153, the SCEF 120 may store at least one of the SCS/AS ID and the SCS/AS reference ID which are received at operation 151. The SCEF 120 may assign an SCEF reference ID in order to indicate the connection with the SCS/AS 125 and use it for the connection with the HSS 115. Based on mobile communication operator's policies, if the SCS/AS 125 is not authorized to perform the group management request, the group management request is not performed. Also, if the group management request is malfunctioning, or if the SCS/AS 125 sends the group management request message more than its quota, the SCEF 120 may transmit a group management response message to the SCS/AS 125 at operation 161 to inform a rejection message and its cause.

At operation 155, the SCEF 120 transmits the group management request message to the HSS 115 to configure group-related information in the HSS 115. This message may include an SCEF ID and an SCEF reference ID for identifying a connection between the SCEF and the HSS in addition to the group management type and the external group ID both of which are received at the operation 151. In addition, the above message may include the member addition/removal indication and an external ID or MSISDN of each UE. Also, the group management request message may include an indication that indicates whether to configure group management related data only up to the HSS 115 or up to the MME 105.

Meanwhile, the operation 155 may be performed for a policy charging resource function (PCRF).

At operation 157, the HSS 115 checks the group management request message received at the operation 155, for example, checks whether the HSS 115 supports the group management request, whether the external group ID exists, whether the external ID or MSISDN exists, and whether the MME/SGSN supports a group management function. If this check fails, the HSS 115 notifies a failure to the SCEF 120 at operation 159 and may also provide a failure reason.

If the above check is successful, the HSS 115 may store the SCEF ID and the SCEF reference ID. The HSS 115 may modify the group ID list of subscriber data of the UE, as follows. The group ID list may indicate a group ID-list field already existing in subscriber data/mobility management (MM) context or may indicate a new field.

If the group management type indicates the group creation, the HSS 115 allocates a new group ID. This new group ID may be associated with the external group ID or any other group ID used in the mobile communication network. The allocated new group ID is added to the group ID list of the subscriber data of the UE(s).

If the group management type indicates the group modification, the HSS 115 derives a group ID, used in the mobile communication network, from the external group ID, and adds or removes the derived group ID to or from the group ID list of the subscriber data of the UE to configure addition/removal of the UE in a specific group.

If the group management type indicates the group removal, the HSS 115 derives a group ID, used in the mobile communication network, from the external group ID, identifies UEs which are members of a relevant group, and removes the derived group ID from the group ID list of the subscriber data of the identified UEs. Also, the HSS 115 removes the external group ID. Using the external ID or MSN ID included in the group management request, the HSS 115 can easily find the UE to be removed from the group list.

At operation 159, the HSS 115 transmits a group management response message to the SCEF 120 to notify acceptance or rejection of the group management request. At operation 161, the SCEF 120 transmits the group management response message to the SCS/AS 125 to notify acceptance or rejection of the group management request. The operations 159 and 161 may be performed after operation 173. In this case, operations 175 and 177 may be omitted.

At operation 163 or 169, the MME/SGSN 105 serving the UE(s) is affected by the group management request.

At operation 163, the HSS 115 may transmit an insert subscriber data request message for updating subscriber data of the UE to the MME/SGSN 105 that supports a group-based subscriber data update. When receiving the insert subscriber data request message, the MME/SGSN 105 performs operations 165 and 167. At operation 169, the HSS 115 may transmit an insert group data request message for updating subscriber data of UEs belonging to a relevant group to the MME/SGSN 105 that supports a group-based subscriber data update. When receiving the insert group data request message, the MME/SGSN 105 performs operations 171 and 173. The insert subscriber data request message or the insert group data request message may include IDs of UEs affected by the group management request, based on the number of UEs belonging to the group or the number of UEs served by the MME/SGSN 105 among the UEs belonging to the group (the insert group data request message is a new message proposed in an embodiment of the present invention).

The HSS 115 may transmit the insert subscriber data request message to the MME/SGSN 105 that does not support a group-based subscriber data update.

At operation 165 or 171, the MME/SGSN 105 verifies the message received at the operation 163 or 169. If the message relates to information about a public land mobile network (PLMN) other than a home PLMN (HPLMN), the MME/SGSN 105 may verify whether the group management function is included in a roaming agreement. If not included, the MME/SGSN 105 may notify a failure to the HSS 115. Also, based on mobile communication operator's policies, the MME/SGSN 105 may reject the request in case of a congestion situation or when the group management request occurs frequently or exceeds its quota.

At operation 167 or 173, the MME/SGSN 105 updates the subscriber data of UE and then transmits an answer message to the HSS 115. The answer message may indicate several UEs belonging to the group. For example, an insert group data answer message including international mobile subscriber IDs (IMSI) of UEs served by the MME/SGSN 105 among group member UEs may be transmitted.

At operation 175, the HSS 115 that receives the answer transmits a group management confirm message to the SCEF 120.

At operation 177, the SCEF 120 transmits the result of the group management request to the SCS/AS 125.

Second Embodiment

The second embodiment of the present invention relates to a method for efficiently controlling a plurality of terminals (UEs) and to an apparatus for performing the method.

Figure 2:
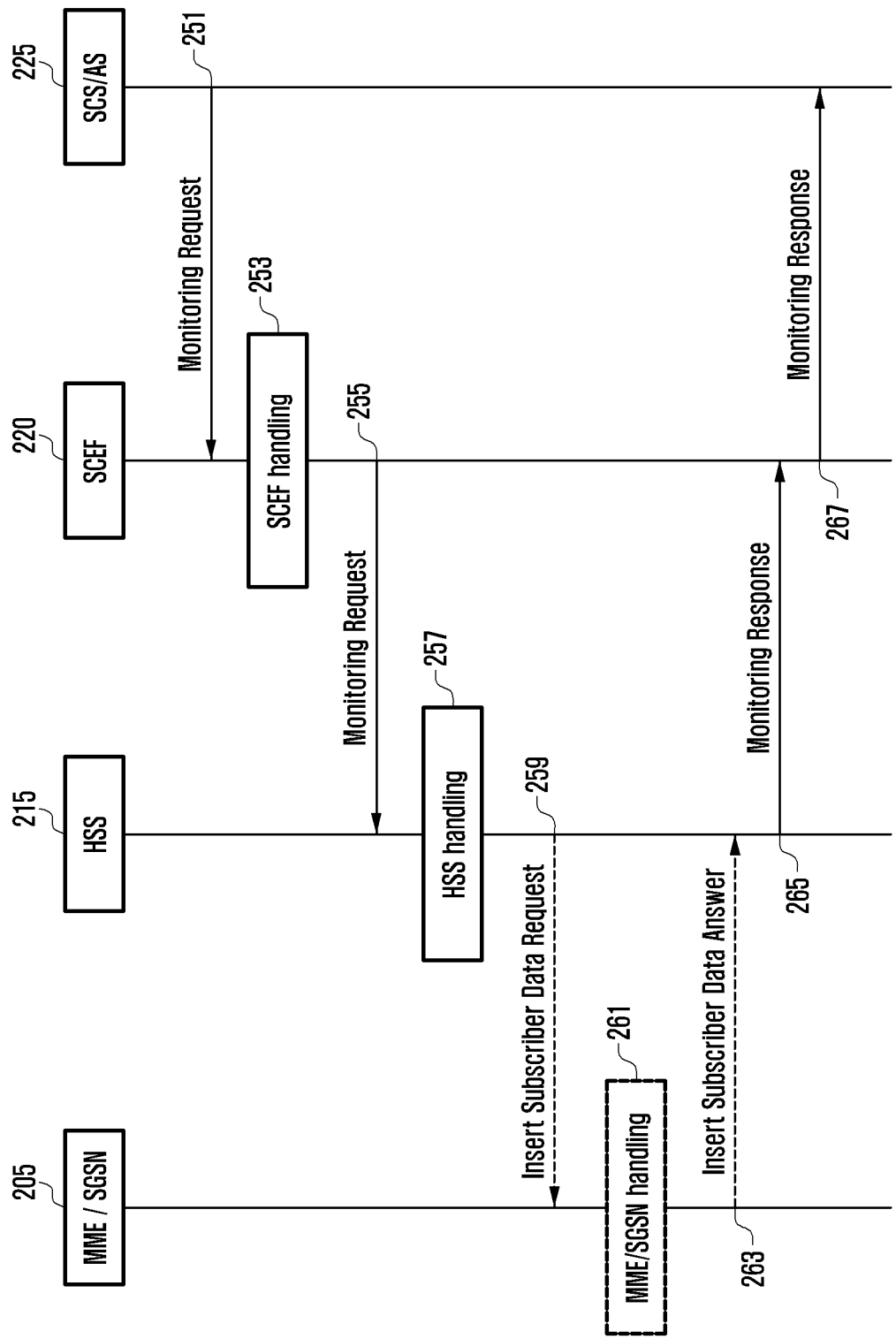
FIG. 2 is a diagram illustrating a monitoring event configuration procedure according to a second embodiment of the present invention.

FIG. 2 is a diagram illustrating a monitoring event configuration procedure according to a second embodiment of the present invention. Proposed in this embodiment is a method for performing group-based monitoring event configuration/report as part of monitoring event configuration/report functions defined in 3GPP. Common parameters and event types are detailed in clauses 5.6.1.2 and 5.6.1.3 to 5.6.1.9 of TS 23.682.

The procedure of FIG. 2 may be performed to replace or delete a monitoring event configuration and also be performed to configure a monitoring event for one-time reporting.

Referring to FIG. 2, a mobile communication system may include an MME/SGSN 205, an HSS 215, an SCEF 220, and an SCS/AS 225. The MME or SGSN 205 may be an entity for managing the mobility of UE and is an entity for collecting monitoring information and reporting it to the HSS 215.

At operation 251, the SCS/AS 225 transmits a monitoring request message to the SCEF 220. The monitoring request message may include at least one of external identifier(s) or MSISDN(s), an SCS/AS identifier, an SCS/AS reference ID, a monitoring type, the maximum number of reports, a monitoring duration, a monitoring destination address, an SCS/AS reference ID for deletion, an external group ID, and a wait time for SCEF, HSS, and/or CN node. The wait time may be called a waiting time. The external group ID indicating an ID of a group to which the UE belongs may be a value associated with an external ID for identifying the UE or an MSISDN which is a mobile communication number of the UE.

Here, the wait time for SCEF, HSS, and MME/SGSN refers to a time for which a relevant network apparatus collects monitoring event results of the UE belonging to the group. In other words, there may be a plurality of UEs managed by one network apparatus, and among them there may be two or more UEs which are members of the external group ID. When a monitoring event occurs at one of the UEs, the apparatus does not send a report on the result of the event immediately, but collects the monitoring event results of the UEs belonging to the group for a specific time and then sends a report. This specific time means the wait time. That is, this may be called a guard timer to send a monitoring report for the group. This timer is stored in the SCEF 220 and the HSS 215 and may be used when each node processes the received monitoring event result. Also, the MME/SGSN 205 may store this timer and use it to process the monitoring event result. If the group ID is included in the monitoring request message, the individual identifier of the UE may not be included. Also, the monitoring request message may include both a group ID and an individual identifier of the UE.

If there are two or more group management request messages, a relative priority scheme for deciding which message will be processed first may be used, and this may comply with setting values of the SCEF.

At operation 253, the SCEF 220 may store at least one of the SCS/AS ID, the SCS/AS reference ID, the monitoring destination address, the monitoring duration, the maximum number of reports, and the wait time which are received at the operation 251. The SCEF 220 may assign an SCEF reference ID in order to indicate the connection with the SCS/AS 225 and use it for the connection with the HSS 215. Based on mobile communication operator's policies, if the SCS/AS 225 is not authorized to perform the monitoring request, the monitoring request is not performed. Also, if the monitoring request is malfunctioning, or if the SCS/AS 225 sends the monitoring request message more than its quota, the SCEF 220 may transmit a monitoring response message to the SCS/AS 225 at operation 267 to inform a rejection message and its cause.

The SCEF 220 stores the received wait time value and, when performing a monitoring event reporting, may collect the monitoring event results of the UEs belonging to the group for the wait time. After the expiration of the wait time, the SCEF 220 may deliver a monitoring report as a single message to the SCS/AS 225.

At operation 255, the SCEF 220 sends the monitoring request message to the HSS 215. This message may include at least one of a UE identifier or UE group identifier, an SCEF ID which is an identifier of the SCEF, an SCEF reference ID for identifying a connection between the SCEF and the HSS, a monitoring type for indicating the type of a monitoring event, the maximum number of reports that can be sent, a monitoring duration, and a wait time. The wait time may be stored in the HSS 215 or the MME/SGSN 205. The monitoring duration refers to a period during which monitoring is performed. During the monitoring duration, the monitoring reports of group members are collected from the first occurrence of the monitoring event for the UE in the group to the expiration of the wait time, and then sent at a time. The wait time starts again immediately or when a group member's monitoring event occurs. This is done within the monitoring duration, and if the monitoring duration expires, no further monitoring is performed.

At operation 257, the HSS 215 checks the monitoring request message received at the operation 255, for example, checks whether the HSS 215 supports a monitoring event function, whether the external group ID exists, whether the external ID or MSISDN exists, whether the MME/SGSN supports the monitoring event function, or whether the monitoring event that should be deleted is valid. If this check fails, the HSS 215 notifies a failure to the SCEF 220 at operation 265 and may also provide a failure reason.

If the above check successful, the HSS 215 may store at least one of the SCEF ID, the SCEF reference ID, the maximum number of reports, the monitoring duration, the SCEF reference ID for deletion, and the wait time (for HSS). For monitoring event reporting, the HSS 215 may use the wait time. Details of the wait time are as described above at the operation 255.

At operation 259, the HSS 215 may configure a required monitoring type to the MME/SGSN 205. For this, the HSS 215 sends an insert subscriber data request message to the MME/SGSN 205. Alternatively, the HSS 215 may send an insert group data request as a single message to two or more UEs which are group members. This message may include identifiers of UEs served by the MME/SGSN 205 among UEs belonging to the group. The insert subscriber data request message or the insert group data request message may include IDs of UEs affected by the group management request, based on the number of UEs belonging to the group or the number of UEs served by the MME/SGSN 205 among the UEs belonging to the group.

At operation 261, the MME/SGSN 205 may be configured to use an interworking SCEF (IWK-SCEF), which is a network apparatus used for a connection with the SCEF of another PLMN. Thus, the IWK-SCEF is an apparatus for delivering information, received from the SCEF, to the MME/SGSN 205 in its PLMN, or delivering information, received from the MME/SGSN 205 in its PLMN, to the SCEF of another PLMN.

The MME/SGSN 205 verifies whether the monitoring type is supported by a roaming agreement, or whether deletion is possible for the SCEF reference ID for deleting monitoring event configuration. If this verification fails, the MME/SGSN 205 provides a failure message and its reason to the SCEF 220 or the IWK-SCEF at operation 263.

The MME/SGSN 205 stores the received parameters and starts to watch for the indicated monitoring event. If the monitoring event requests a one-time report, a monitoring report may be included in an answer to the message of the operation 259. In this case, after waiting for the wait time and confirming the monitoring events of the UEs belonging to the group, the monitoring report may be delivered by constructing a message in response to the operation 259 to include the identifiers of UEs belonging to the group.

The MME/SGSN stores, as context, parameters for monitoring configured in the above procedure, and may deliver it whenever the MME/SGSN changes.

If the monitoring configuration is successful, the MME/SGSN 205 sends an answer message to the HSS 215 at operation 263. This answer message may be an insert subscriber data answer or insert group data answer. If a group of subscriber data insert requests are received from the HSS, this answer may be a reply to the group. If the monitoring event occurs before sending the answer message, the monitoring event result may be included in the answer message.

At operation 265, the HSS 215 sends a response message to the monitoring request to the SCEF 220. This message includes a result of processing the monitoring request. If the monitoring event configuration is a one-time monitoring, the HSS 215 deletes the monitoring event configuration after processing the monitoring report. Also, the wait time may be deleted.

If the UE moves to another region, the HSS 215 may determine whether the MME/SGSN 205 serving the UE in that region supports a group-based monitoring event. If not supported, it is impossible to perform a group-based monitoring operation for the UE belonging to the region. Therefore, the HSS 215 may notify, to the SCEF 220, information about the UE belonging to the region of the MME/SGSN 205 that does not support the group-based monitoring event. Or the following operation 267 (a) or (b) may be performed.

At operation 267, the SCEF 220 sends a monitoring response message to the SCS/AS 225. If the monitoring result report is received at the operation 265, this is included in the above message. If there is the monitoring report received before the monitoring response arrives from the HSS 215, this may be collected and then included in the monitoring response to be transmitted to the SCS/AS 225. Or the monitoring reports may be collected during the wait time and then included in the monitoring response to be sent to the SCS/AS 225.

If the HSS 215 fails to support a group-based monitoring event or a specific monitoring event with regard to the current MME/SGSN serving the UE, e.g., if the UE moves to a region of the MME/SGSN, the HSS 215 may perform the following operation (a) or (b).

(a) The HSS 215 notifies the SCEF that the configured monitoring event is canceled. Also, the HSS 215 deletes the configured monitoring event. And also, the HSS 215 may provide an indication called "retry after" to the SCEF. This means to try the monitoring event configuration again later. When this information is transmitted to the SCEF 220, the SCEF 220 may send this information to the SCS/AS 225 to perform a monitoring event configuration request again later.

(b) The HSS 215 notifies the SCEF 220 that the configured monitoring event is suspended. The SCEF 220 interprets this to mean that the network is temporarily unable to support the configured monitoring event. Thereafter, if the MME/SGSN 205 changes, and if the new MME/SGSN 205 can support the suspended monitoring event, the HSS 215 configures the new MME/SGSN with the suspended monitoring event and notifies the resumption of the suspended monitoring event to the SCEF 220. If a period of sending the monitoring report expires while the monitoring event is suspended, the HSS 215 and the SCS/AS 225 delete the monitoring event.

Figure 3:
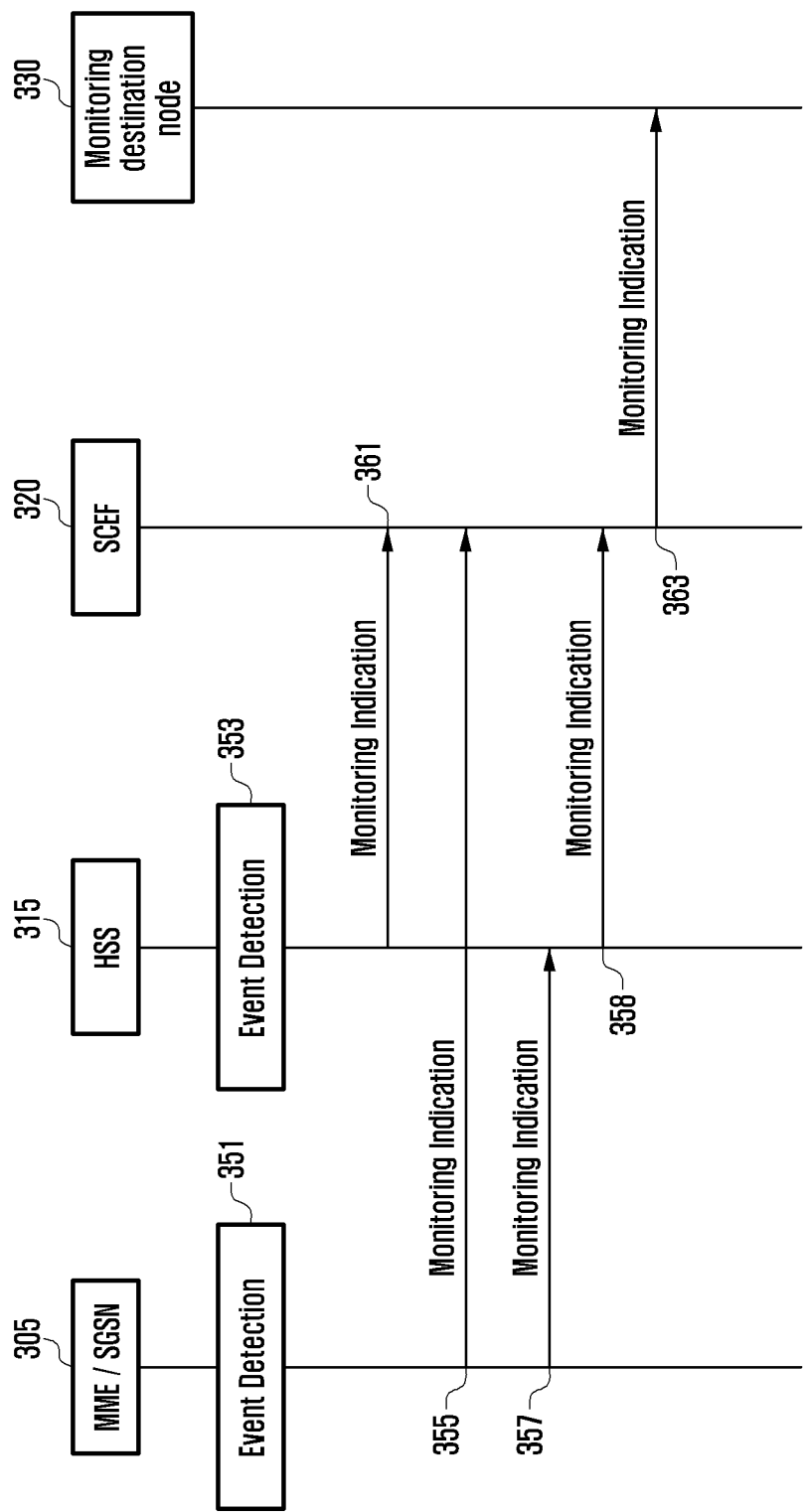
FIG. 3 is a diagram illustrating a monitoring event reporting procedure in an embodiment of the present invention.

FIG. 3 is a diagram illustrating a monitoring event reporting procedure in an embodiment of the present invention.

Referring to FIG. 3, a system may include an MME/SGSN 305, an HSS 315, an SCEF 320, and a monitoring destination node 330. This embodiment of FIG. 3 may provide a method of delivering a monitoring report for a group when reporting the result of a monitoring event. The monitoring destination node 330 may be an SCS/AS.

At operation 351 or 353, a monitoring event may be detected by a node at which the monitoring event is configured. The monitoring event may be detected by the MME/SGSN 305 at the operation 351 or by the HSS 315 at the operation 353.

Operation 355 is a case where the MME/SGSN 305 directly sends the monitoring report to the SCEF 320. At the operation 355, the MME/SGSN 305 delivers a report for the detected monitoring event to the SCEF 320. The MME/SGSN 305 may deliver a monitoring indication message to the SCEF 320, and this indication message may include an SCEF reference ID and a monitoring event report. At this time, the monitoring event report may include information about UE for which the monitoring event is detected. The SCEF 320 may receive this message and determine which monitoring event report of which UE. In this case, the MME/SGSN 305 may collect the monitoring reports of other UEs belonging to the group during the wait time provided in the monitoring configuration procedure after the first monitoring event occurs, and then send the collected monitoring reports at a time after the expiration of the wait time.

Operation 357 is a case where the MME/SGSN 305 delivers the monitoring report to the HSS 315. The MME/SGSN 305 may deliver the monitoring indication message to the HSS 315, and this indication message may include an SCEF reference ID, a monitoring event report set, and a group ID or IMSI(s). If the monitoring event is requested based on the group, the MME/SGSN 305 may deliver the monitoring indication message for sending the monitoring report with regard to the group. Therefore, the monitoring indication message includes the group ID or IMSI which is the ID of UE which is a group member. One or more IMSIs may be included. Also, the monitoring report of this message indicates that the monitoring report relates to a group-based monitoring event. In this case, the MME/SGSN may collect the monitoring reports of other UEs belonging to the group during the wait time provided in the monitoring configuration procedure after the first monitoring event occurs, and then send the collected monitoring reports at a time after the expiration of the wait time.

At operation 358, the HSS 315 that receives the monitoring indication message checks that the report is for which group and which monitoring event, and then delivers it to the SCEF 320. In this case, the HSS 315 may collect the monitoring reports of other UEs belonging to the group during the wait time provided in the monitoring configuration procedure after the monitoring report is received from the MME/SGSN 305, and then send the collected monitoring reports to the SCEF 320 at a time after the expiration of the wait time.

Operation 361 is a case where the HSS 315 that detects the monitoring event configures the monitoring report and sends it to the SCEF 320. The HSS 315 may send a monitoring indication message to the SCEF 320. If the monitoring event of UE belonging to the group is detected, the HSS 315 may collect monitoring events of other UEs or additional monitoring events of the same UE during the wait time, and then send the collected monitoring reports to the SCEF 320 at a time after the expiration of the wait time. At this time, it is possible to include the external group ID for identifying the group and the external ID or MSISDN for identifying the UE for which the monitoring event is found. If the monitoring events occur for all UEs in the group, only the external group ID may be included without the individual identifier of the UE when the monitoring report is transmitted to the SCEF. The SCEF 320 may interpret this as the occurrence of event for all UEs.

At operation 363, the SCEF 320 may deliver the received message to the monitoring destination node 330. The monitoring destination node 330 may be the SCS/AS. At this time, the SCEF 320 may collect the monitoring reports for other UEs belonging to the group during the wait time after the monitoring report is received from the HSS. After the expiration of the wait time, the SCEF 320 delivers the collected monitoring reports to the SCS/AS together with the external group ID for indicating the group and the external ID or MSISDN of the UE for which the monitoring event occurs. If the monitoring events occur for all UEs in the group, only the external group ID may be included without the individual identifier of the UE when the monitoring report is sent to the SCS/AS. The SCS/AS may interpret this as the occurrence of event for all UEs.

Figure 4:
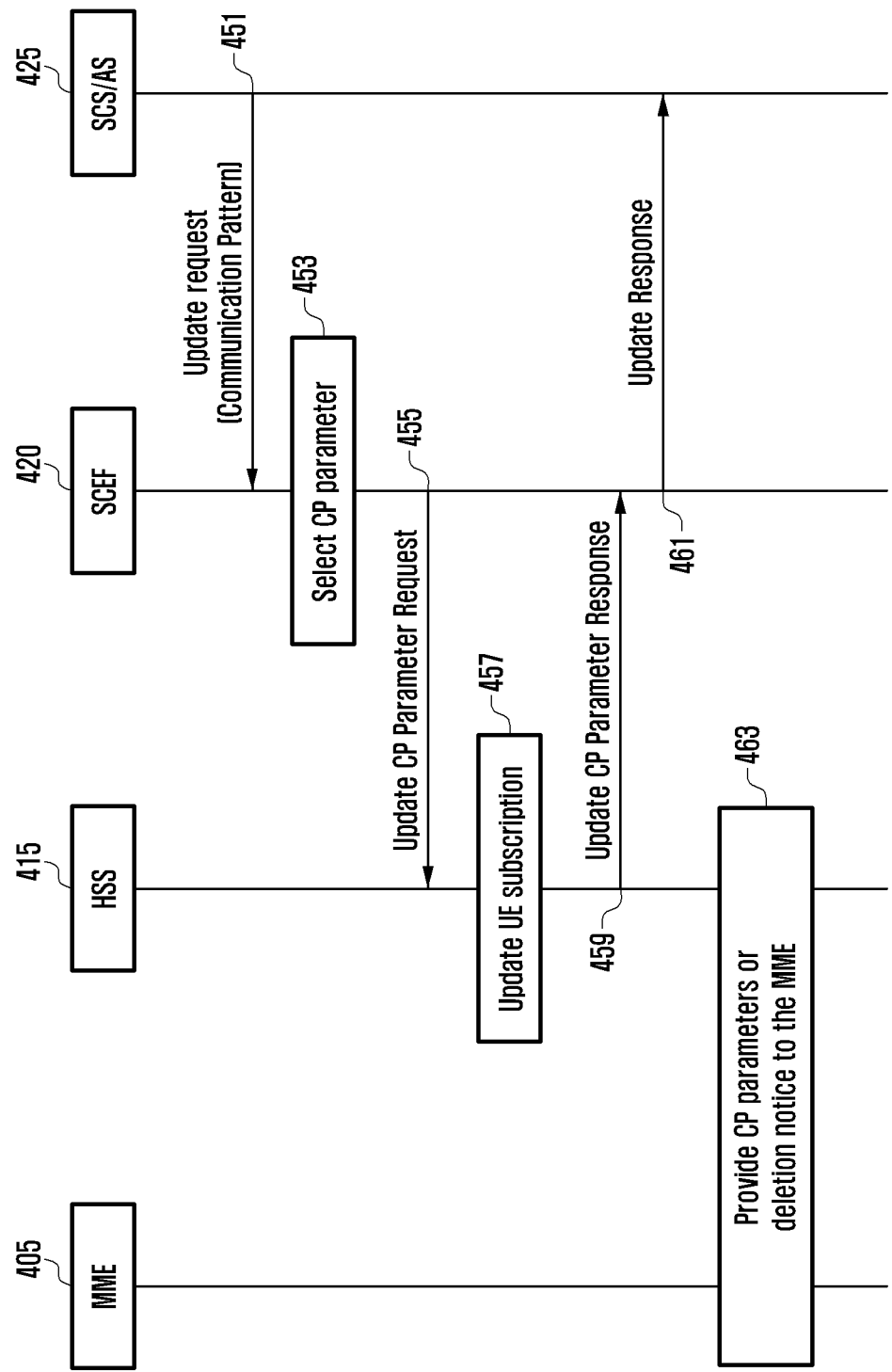
FIG. 4 is a diagram illustrating a communication pattern parameter provisioning procedure according to an embodiment of the present invention.

FIG. 4 is a diagram illustrating a communication pattern parameter provisioning procedure according to an embodiment of the present invention.

Referring to FIG. 4, a communication system may include an MME 405, an HSS 415, an SCEF 420, and an SCS/AS 425.

A communication pattern (CP) parameter described in this embodiment of FIG. 4 is as shown in Table 1.

TABLE 1

| CP parameter | Description |
| --- | --- |
| 1) Periodic communication indicator | Identifies whether the UE communicates periodically or not, e.g, only on demand. [optional] |
| 2) Communication duration time | Duration interval time of periodic communication [optional, may be used together with 1)] Example: 5 minutes |
| 3) Periodic time | Interval Time of periodic communication [optional, may be used together with 1)] Example: every hour |
| 4) Scheduled communication time | Time zone and Day of the week when the UE is available for communication [optional] Example: Time: 13:00-20:00, Day: Monday |
| 5) Stationary indication | Identifies whether the UE is stationary or mobile [optional] |

At operation 451, the SCS/AS 425 sends an update request message to the SCEF 420. The update request message may be a message for updating or configuring a communication pattern. In order to configure the communication pattern, the SCS/AS 425 may request the SCEF 420 by using the external group ID which is the group ID to which the UE belongs.

At operation 453, the SCEF 420 may select a communication pattern or a communication pattern parameter. After authenticating the request of the SCS/AS at the operation 451, the SCEF 420 may select the communication pattern parameter. When several communication pattern parameters are active for one UE, the SCEF may set different activation patterns to be not overlapped with each other.

At operation 455, the SCEF 420 may send a communication pattern (CP) parameter update request message (or update CP parameter request) to the HSS 415. The pattern parameter update request message includes the external group ID, and may request to configure the communication pattern for the UEs belonging to the group.

At operation 457, the HSS 415 may update subscription information of the UE. The HSS 415 may check the CP parameter update request by using information such as the External ID or MSISSN. If the check fails, the HSS may send a response for informing the failure to the SCEF 420 at operation 459.

If the check is successful, the HSS 415 may update information of the UE, based on the CP parameter update request. The HSS 415 may store the CP parameters and may deliver them to the MME 405.

At operation 459, the HSS 415 may send a CP parameter response message (or update CP parameter response) to the SCEF 420. The CP parameter response message may include a SCEF reference ID and information indicating the success or failure of the update.

At operation 461, the SCEF 420 may send an update response message to the SCS/AS 425. The response message may include the SCEF reference ID and the information indicating the success or failure of the update. Through the response message, the SCEF may inform the SCS/AS whether provision of the CP parameter is successful.

At operation 463, the HSS 415 may initiate an insert subscription/group data procedure for the MME 405 and provide information about the CP parameter. The MME may confirm that information about the existing CP parameter is modified, delete the CP parameter, and store the new CP parameter.

Third Embodiment

The third embodiment of the present invention relates to a method and apparatus for providing a service of a roaming network.

Figure 5:
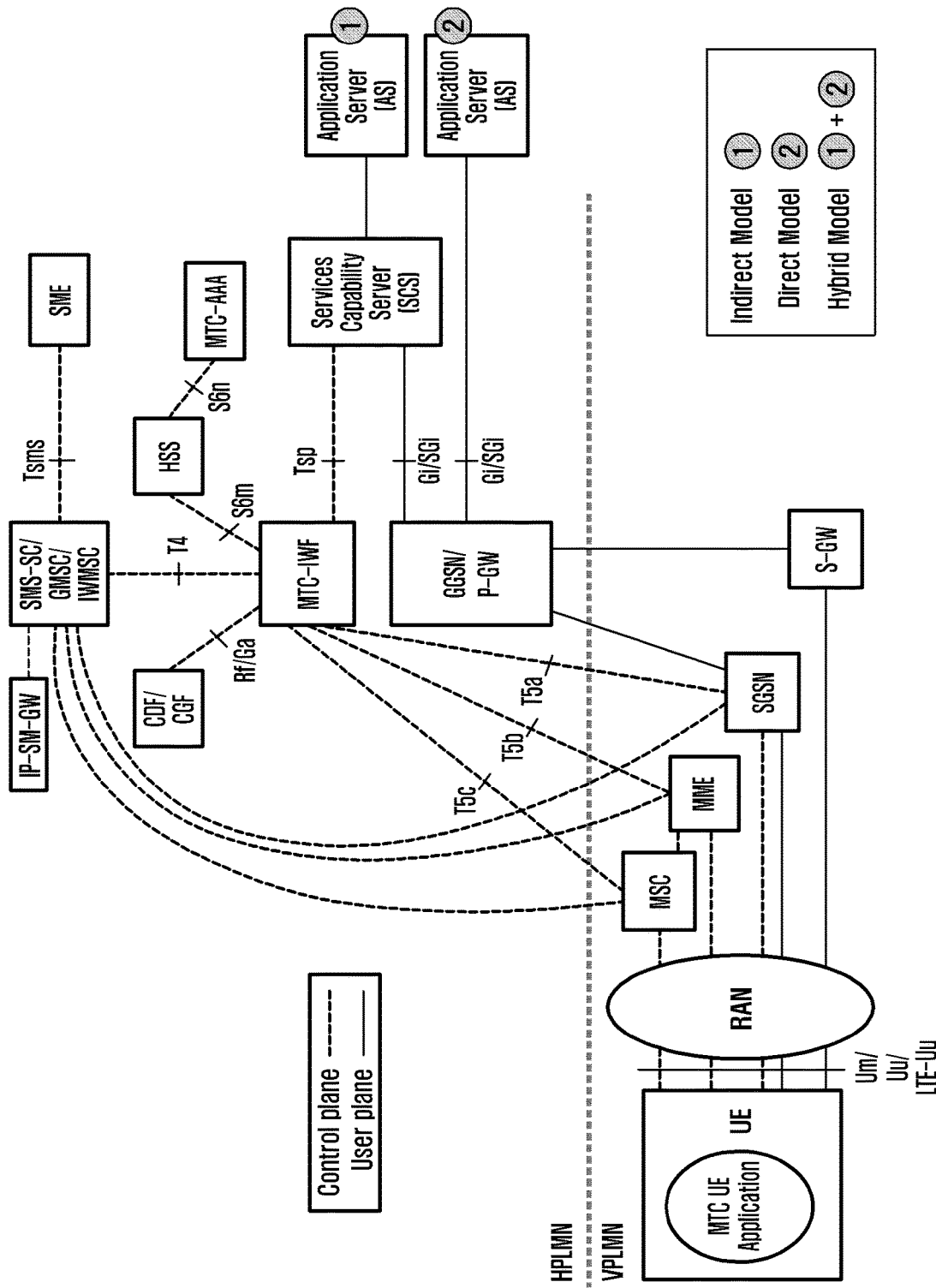
FIG. 5 is a diagram illustrating a structure of a communication system for a terminal or a machine type communication (MTC) apparatus according to an embodiment of the present invention.
Figure 6:
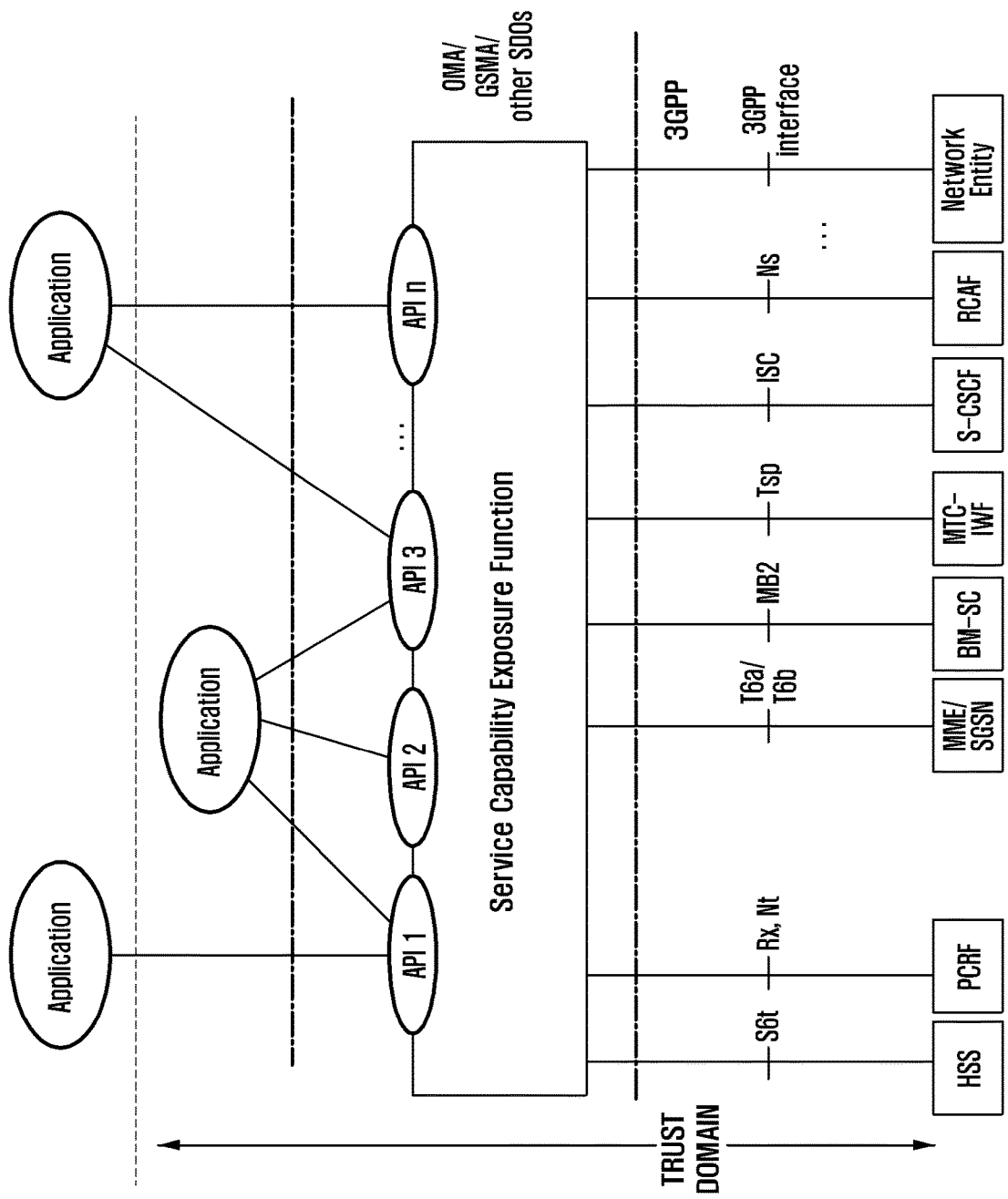
FIG. 6 is a diagram illustrating architecture for service capability exposure according to an embodiment of the present invention.
Figure 7:
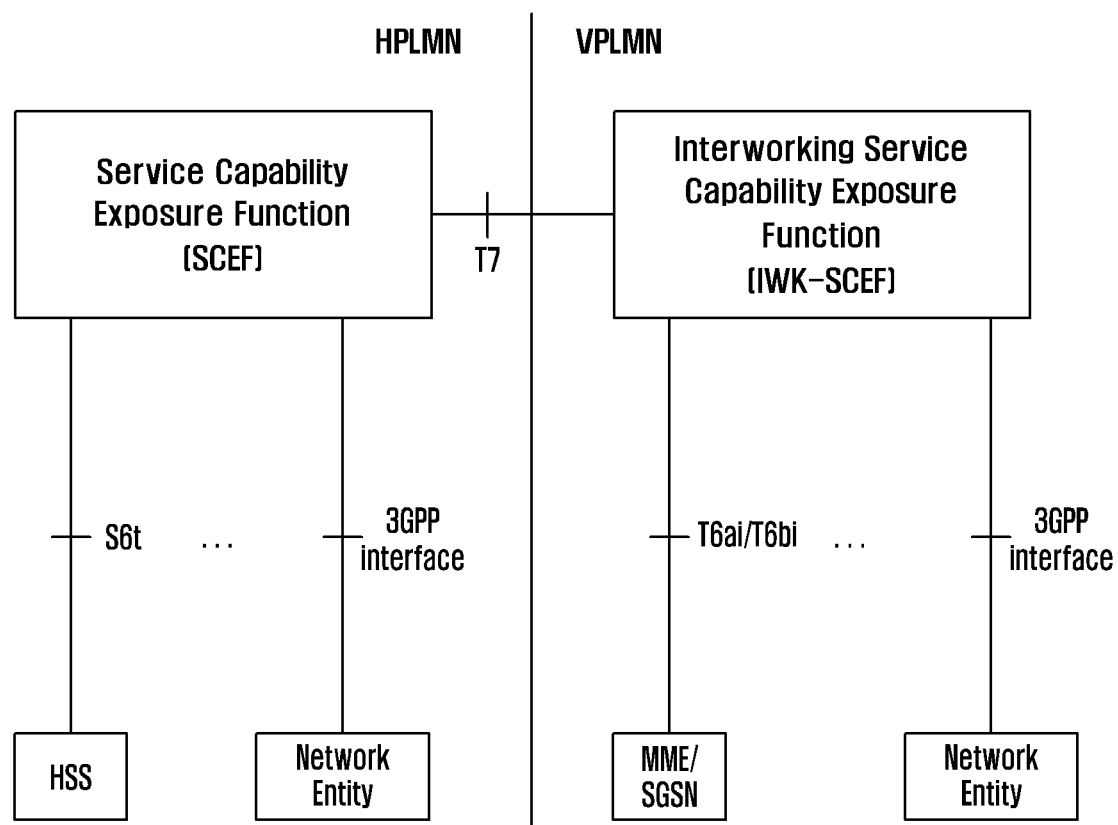
FIG. 7 is a diagram illustrating roaming architecture for service capability exposure according to an embodiment of the present invention.

FIG. 5 is a diagram illustrating a structure of a communication system for a terminal or a machine type communication (MTC) apparatus according to an embodiment of the present invention. FIG. 6 is a diagram illustrating architecture for service capability exposure according to an embodiment of the present invention. FIG. 7 is a diagram illustrating roaming architecture for service capability exposure according to an embodiment of the present invention.

In the third embodiment of the present invention, an entity, a connection relationship, an interface, architecture of HPLMN and visited public land mobile network (VPLMN), and a service capability exposure, which are described in the communication system structure of FIGS. 5, 6 and 7, may be used.

When the UE is a roaming UE, it is necessary to know the HPLMN ID of the UE in order to know whether the SCEF can provide a service to the roaming UE. This is because it is necessary to check whether MB2 connection or Rx or Nt connection exists for roaming.

In the third embodiment, the SCS/AS may request the serving PLMN ID of the UE and check whether there is a connection with the corresponding PLMN. If the IP address of the UE is within the range determined by the specific PLMN, it is possible to confirm the corresponding roaming agreement or the connection with the roaming network by identifying the PLMN to which the UE belongs. Based on this, the SCS/AS makes a request to the SCEF, and the SCEF may confirm whether there is a network apparatus connected to the PLMN.

Figure 8:
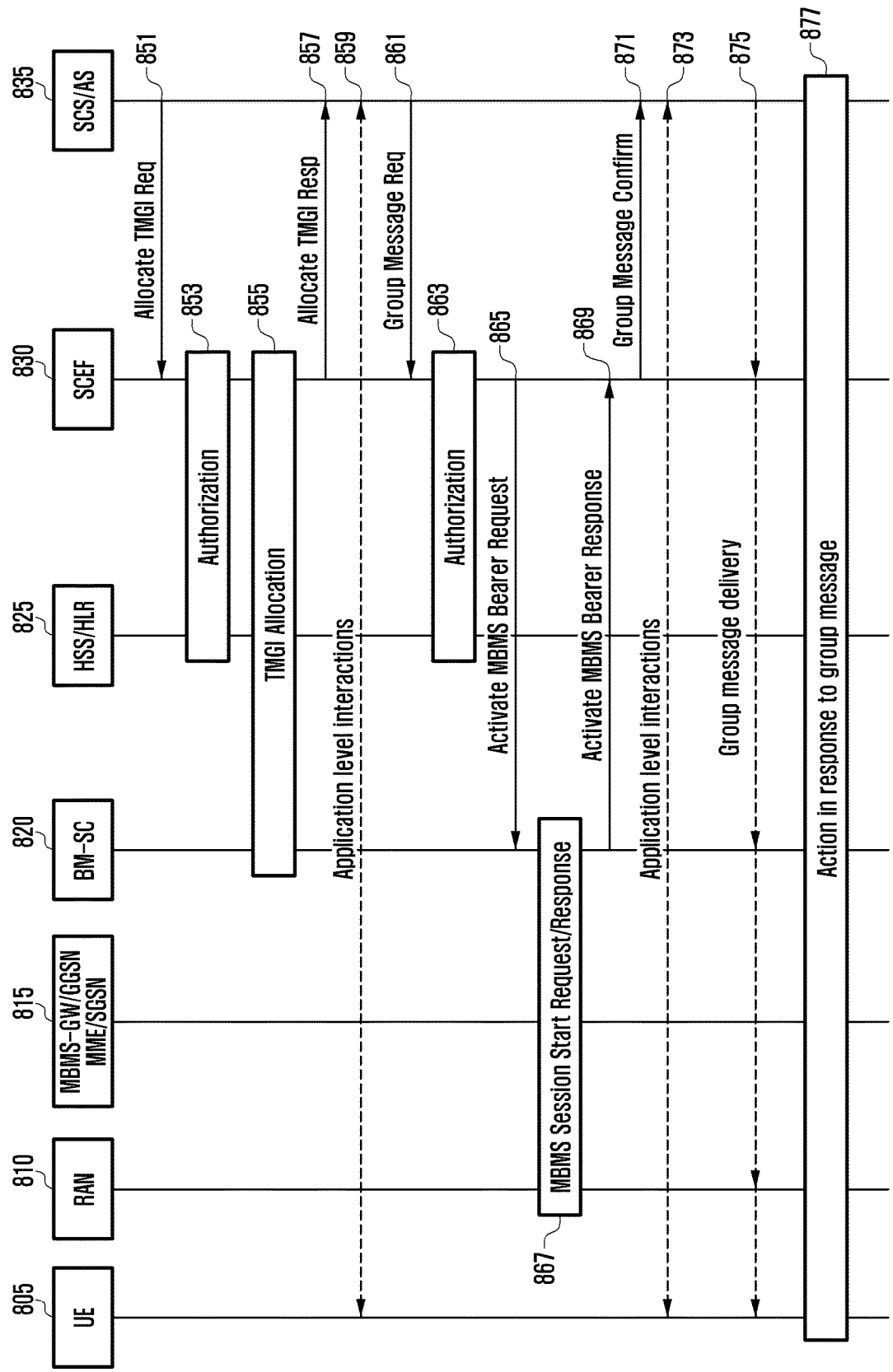
FIG. 8 is a diagram illustrating a group message delivery procedure using multimedia broadcast/multicast services (MBMS) according to an embodiment of the present invention.

FIG. 8 is a diagram illustrating a group message delivery procedure using multimedia broadcast/multicast services (MBMS) according to an embodiment of the present invention.

Referring to FIG. 8, a communication system may include a UE 805, a radio access network (RAN) 810, an MBMS gateway (MBMS-GW)/gateway GPRS support node (GGSN) 815, an MME/SGSN 815, a broadcast multicast service center (BM-SC) 820, an HSS/home location register (HLR) (HSS/HLR) 825, an SCEF 830, and an SCS/AS 835.

At operation 851, the SCS/AS 835 sends a temporary mobile group identity (TMGI) allocation request message (or allocate TMGI request) to the SCEF 530. The TMGI allocation request message may include an external group ID, an SCS identifier, and location/area information. The location/area information is information indicating the location/area of the UE. When sending a message at the operation 851, the SCS/AS 830 may transmit the location/area information of the UE together. Based on a location/area identified from the location/area information, the SCEF 830 may derive a corresponding PLMN ID.

At operation 853, the SCEF 830 performs authorization with the HSS/HLR 825. The SCEF 830 checks whether the SCS/AS 835 is authorized to perform TMGI allocation. The SCEF 830 may derive the PLMN ID from the location/area information received at the operation 851. Based on this, the SCEF 830 may check whether there is an interface such as MB2 or T7 with a network apparatus of the corresponding PLMN. If the check fails, the SCEF 830 sends a rejection message to the SCS/AS 835, and this message may include a reason for the rejection.

At operation 855, a TMGI allocation procedure may be initiated between the SCEF 830, the HSS/HLR 825, and the BM-SC 820. This procedure is specified in TS 23.468.

At operation 857, the SCEF 830 sends a TMGI assignment response message (or allocate TMTI response) to the SCS/AS 835. The SCEF 830 may transmit the allocated TMGI and expiration time information.

Application level interactions may be performed at operation 851.

At operation 861, the SCS/AS 835 may send a group message request message to the SCEF 830. The group message request message may include at least one of an external group identifier, an SCS identifier, location/area information, RAT(s) information, TMGI, and a start time. The location/area information may be geographical location/area information.

At operation 863, the SCEF 830 and the HSS/HLR 825 may perform an authorization operation. The SCEF 830 checks whether the SCS/AS 835 is authorized to send a group message. The SCEF 830 may derive the PLMN ID from the location/area information received at the operation 851. Based on this, the SCEF 830 may check whether there is an interface such as MB2 or T7 with a network apparatus of the corresponding PLMN. If the check fails, the SCEF 830 sends a rejection message to the SCS/AS 835, and this message may include a reason for the rejection.

At operation 865, the SCEF 830 may send an MBMS bearer activation request message (or activate MBMS bearer request) to the BM-SC 820. The MBMS bearer activation request message may include an MBMS broadcast area, a TMGI, a QoS, and a start time.

At operation 867, the BM-SC 820 performs a session start procedure. This procedure is specified in TS 23.246.

At operation 869, the BM-SC 820 sends an MBMS bearer response message (or activate MBMS bearer response) to the SCEF 830.

At operation 871, the SCEF 830 may send a group message confirmation message (or group message confirm) to the SCS/AS 835. The group message confirmation message may indicate whether the request at the operation 861 is accepted.

Application level interactions may be performed at operation 873.

At operation 875, the SCS/AS 835 may send, to the SCEF 830, content to be delivered to the group. The content may be delivered to the UE 805 via the BM-SC 820 and the RAN 810.

At operation 877, the UE 805 may perform a response action. The response action may be performed immediately or after a certain time elapses.

Fourth Embodiment

The fourth embodiment of the present invention relates to a method of communication via a path suitable for a service characteristic and to an apparatus for performing the method.

Figure 9:
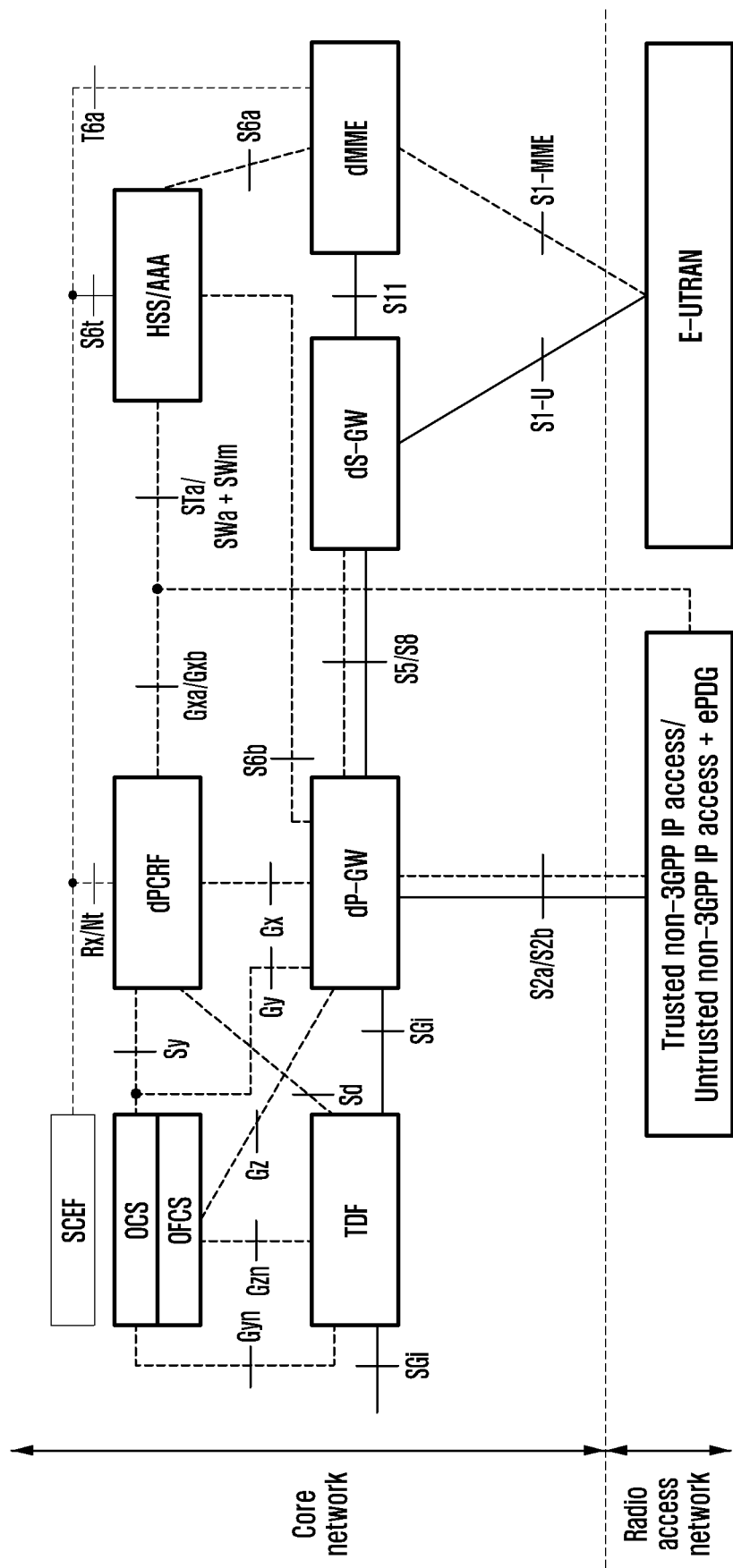
FIG. 9 is a diagram illustrating architecture of a radio access network and a core network according to an embodiment of the present invention.

FIG. 9 is a diagram illustrating architecture of a radio access network and a core network according to an embodiment of the present invention.

In the pre-release 14 architecture, a dedicated core (DECOR) for enabling the UE to access a specific core network, and an SCEF for opening and negotiating the capability of a mobile communication network for an IoT service have been introduced.

Using this, the network architecture as shown in FIG. 9 may be constructed. In FIG. 9, "d" denotes dedicated.

Figure 10:
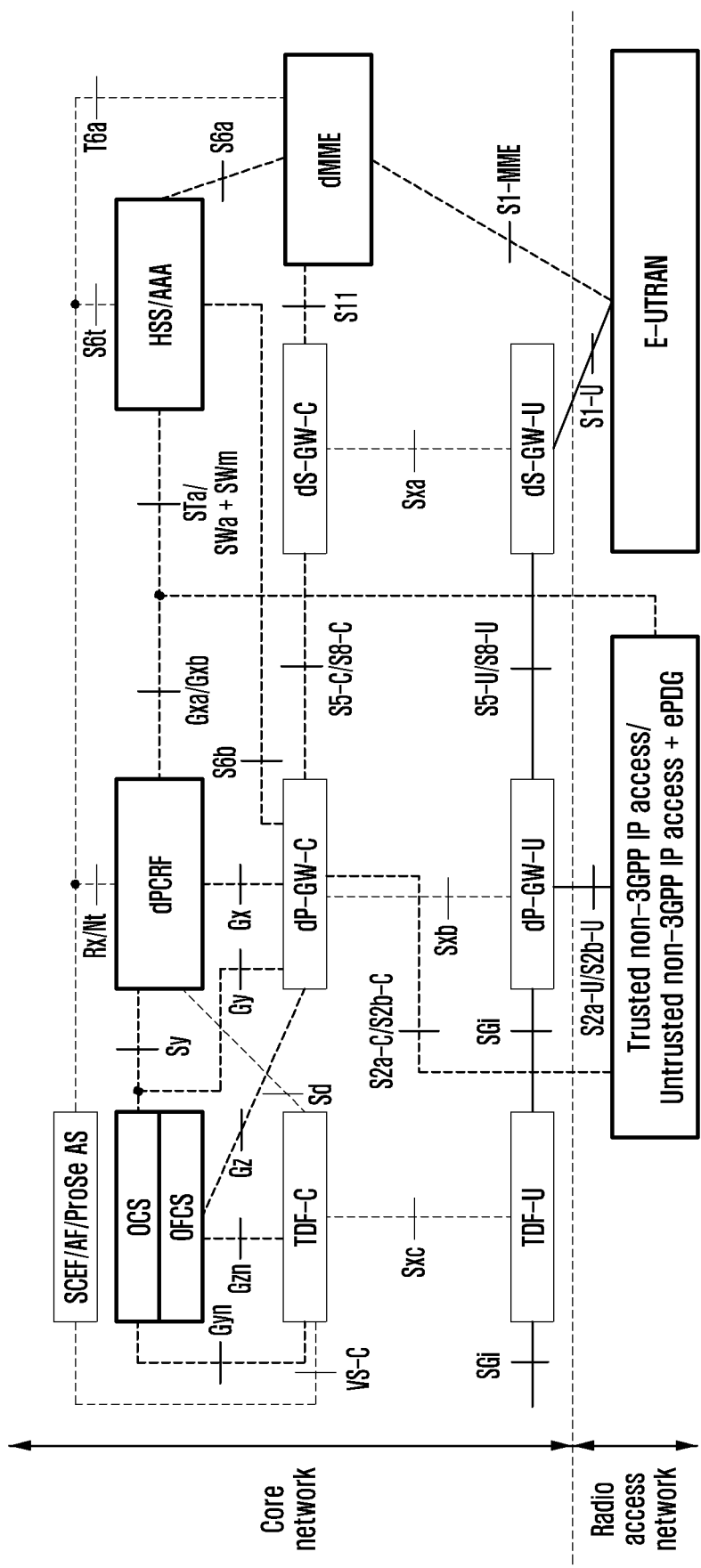
FIG. 10 is a diagram illustrating architecture of a radio access network and a core network according to another embodiment of the present invention.

FIG. 10 is a diagram illustrating architecture of a radio access network and a core network according to another embodiment of the present invention.

In the release 14 architecture, a control plane and a user plane of gateway (GW) are distinguished from each other, so that a software-defined network (SDN) concept may be applied to the network architecture. In addition, an eDecor is proposed as an improved mechanism for connecting the UE to the dedicated core, and a group based enhancement for efficiently managing a large number of IoT devices may be proposed. Also, vertical services such as sponsored charging, which allows a third-party provider to charge for data transmission and reception with a specific application, and vehicle to everything (V2X) may be supported in the mobile communication network.

If the release 14 architecture as shown in FIG. 10 is applied, the 3GPP network may be structured as described above. A traffic detection function (TDF) may analyze a traffic transmitted to the UE and determine a service type and a packet type (voice, video, etc.).

Figure 11:
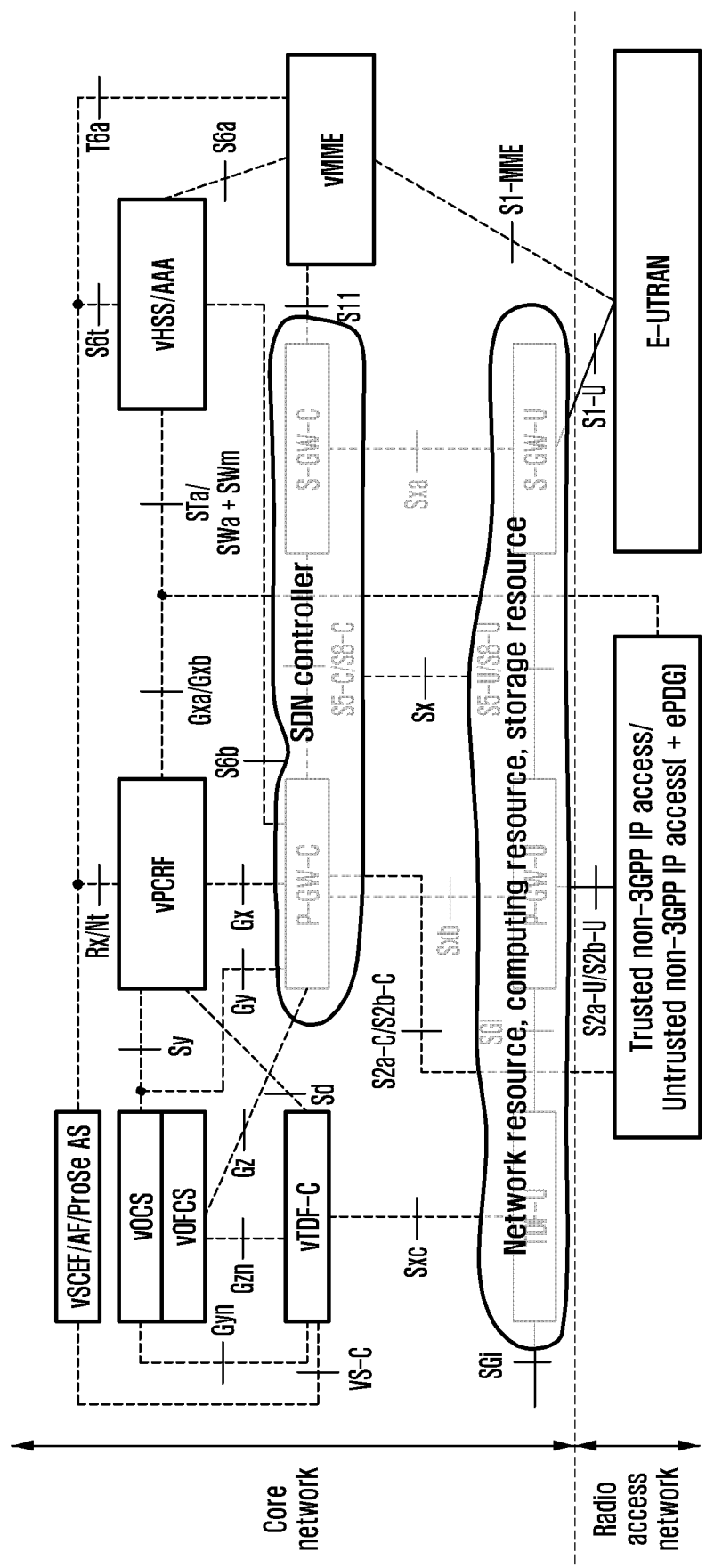
FIG. 11 is a diagram illustrating architecture of a radio access network and a core network according to still another embodiment of the present invention.

FIG. 11 is a diagram illustrating architecture of a radio access network and a core network according to still another embodiment of the present invention.

Implementation based on the release 14 features may be as shown in FIG. 11. That is, the GW of the 3GPP network may have a full SDN structure, and all user planes may be replaced with network resources. Those that transmit data to the UE and store data of the UE may be configured differently from an SDN controller that controls the data transmission of the UE.

Figure 12:
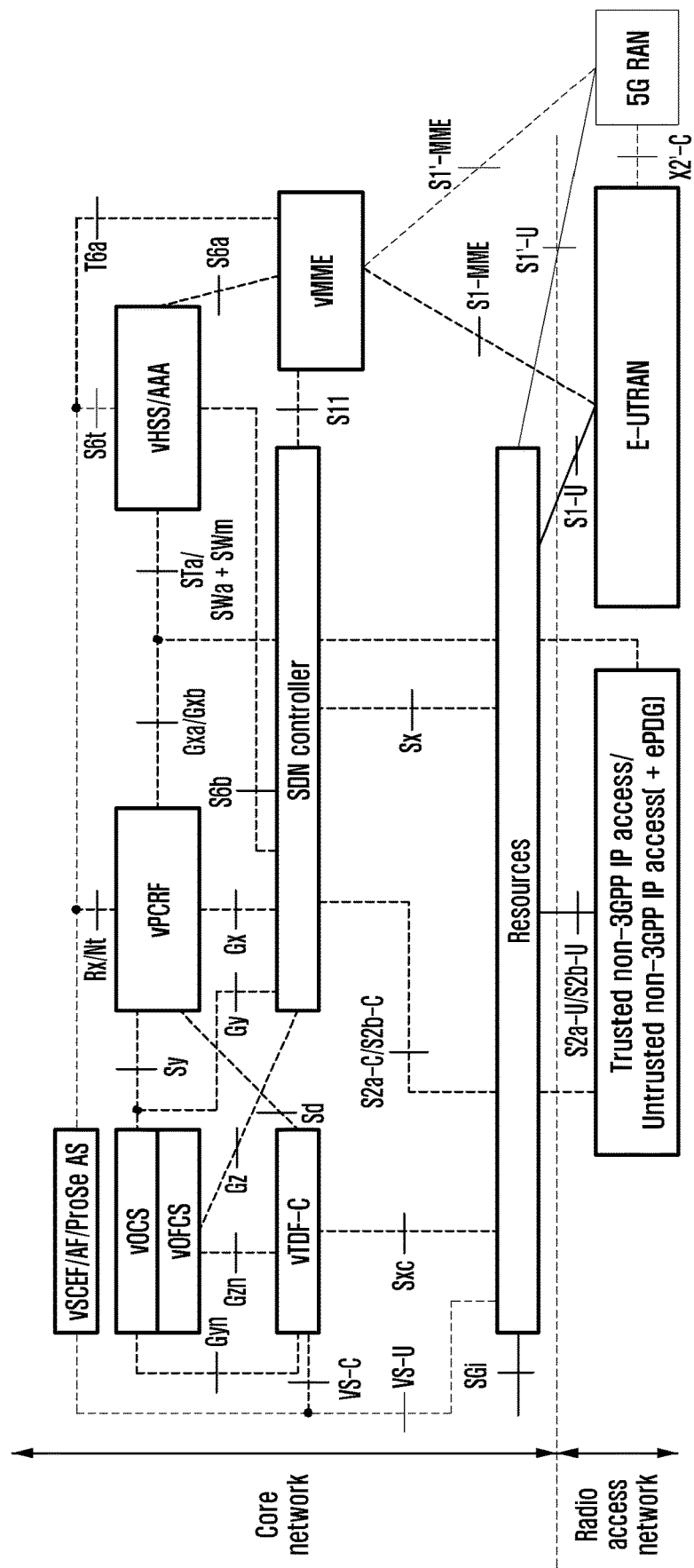
FIG. 12 is a diagram illustrating architecture of a radio access network and a core network according to yet another embodiment of the present invention.

FIG. 12 is a diagram illustrating architecture of a radio access network and a core network according to yet another embodiment of the present invention.

Beyond the release 14, the network architecture may be developed as shown in FIG. 12. As the SCEF becomes more usable, it is possible to provide a service by coordinating external network and internal network information to enable a content delivery network (CDN). In addition, a connection with a network apparatus for providing a V2X service may act as a window for connecting an external V2X server and a mobile communication network. Also, the SCEF may interact with a server having external sponsored subscription information and thereby connect with a network function responsible for charging UE so that a data service of the specific UE can be used free of charge. In another user scenario, it is possible to realize a CriC service that communicates with a low latency through a data path optimization based on UE locations. This is because the location information of the UE can be shared with the inside and outside of the mobile communication through the SCEF and thus it is possible to set a data path closest to the UE.

When SDN is activated, the following functions may be performed through the SCEF.

Service detection: The TDF may check packets transmitted/received by the UE and determine which service is used by the UE through the SCEF. The PCRF may configure relevant information to the SDN controller to provide the optimized service.

Service categorization: The SCEF may inform the TDF about the type of traffic to be used by the UE, based on information provided by the application server or external server, thereby allowing the application server or third-party provider to charge data of the UE. Also, the SCEF may grasp information provided by the application server or external server and notify it to the SDN controller to set a data transfer path to the UE (Path definition, path provision).

The SCEF is an abbreviation of Service Capability Exposure Function, and refers to a network function of exposing a mobile communication network function and capability to the inside/outside and exchanging information.

Fifth Embodiment

The fifth embodiment of the present invention relates to a method of communication of service contents distributed near a user and to an apparatus for performing the method.

Figure 13:
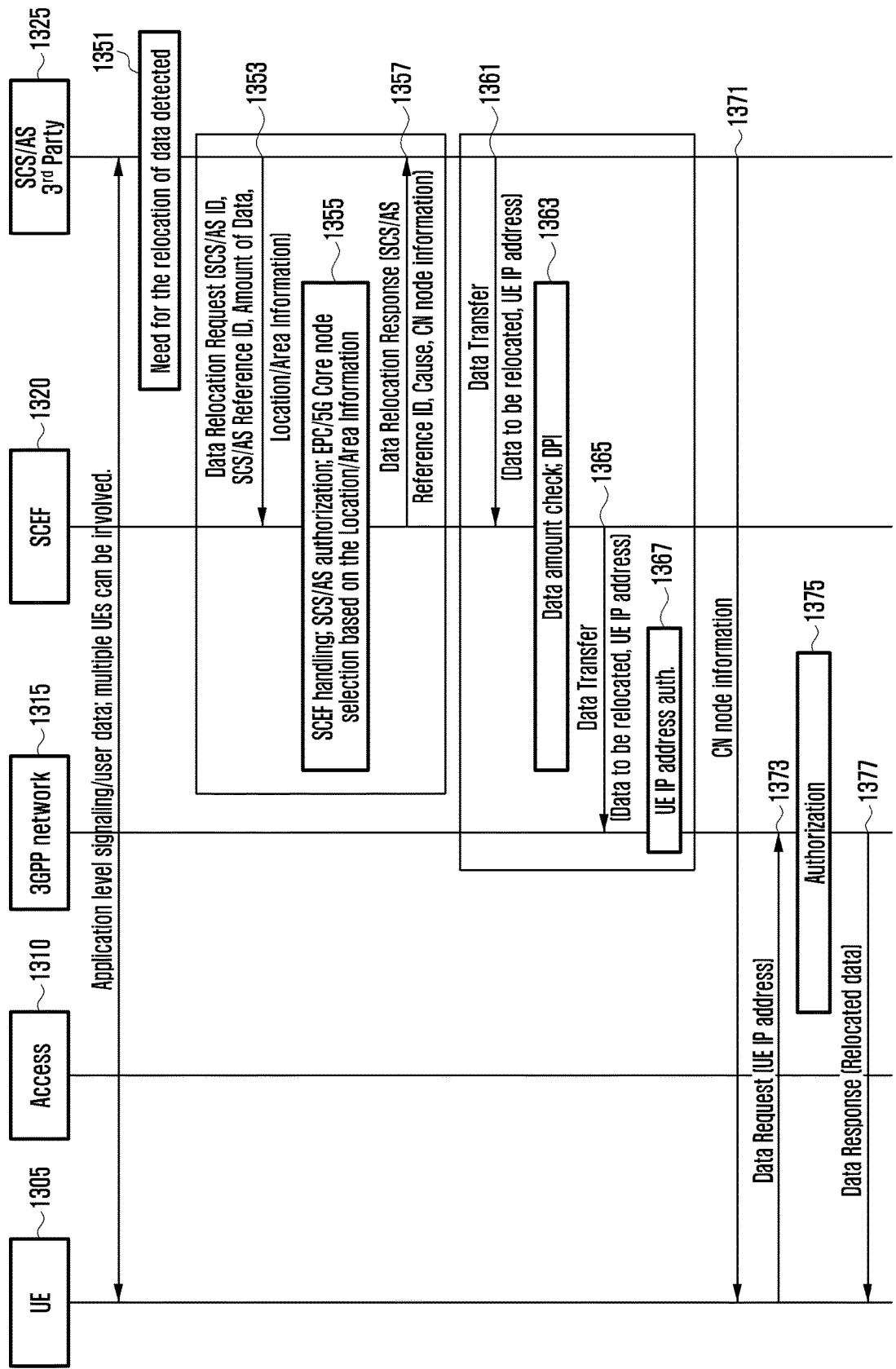
FIG. 13 is a diagram illustrating a scheme of activating content delivery network (CDN) by using SCEF.

FIG. 13 is a diagram illustrating a scheme of activating a contents deliver network (CDN: technique of deploying traffic to be delivered to UE near UE for smooth data communication) by using SCEF.

Referring to FIG. 13, a system of the fifth embodiment may include a UE 1305, an access 1310, a 3GPP network 1315, an SCEF 1320, and an SCS/AS 1325.

The SCS/AS 1325 or third party 1325 provides a service to the UE and exchanges data therefor. The SCS/AS 1325 may grasp location information or service information of the UE through the service provided to the UE.

At operation 1351, the SCS/AS 1325 or the 3rd party 1325 may have a need for the relocation of a data path to the UE. For example, it may be decided that the UE has moved to another area and there is a data center close to the area. Also, in the expectation that the amount of data to be used by the UE will increase in a current area of the UE, it is possible to make a decision to deploy a server capable of processing large capacity data at the current UE location so as to provide, for example, high-quality video streaming.

At operation 1353, the SCS/AS 1325 or the third party 1325 may send a request to the SCEF 1320 to relocate the data path of the UE. This message for the request may be a data relocation request. This may include a current location of the UE, the amount of data to be used by the UE, or a data center address to be provided to the UE.

At operation 1355, the SCEF 1320 that receives the request may check whether the SCS/AS 1325 or the third party 1325 is authorized to make such a request and to request a change of network information. Then, the SCS/AS 1325 or the third party 1325 sees the location information requested according to the above procedure and establishes a data path of the UE to a user plane resource, i.e., gateway, near the current UE location and the data center so that the UE can perform high-speed, large-capacity communication with the data center being at the location. In other words, it is possible to deploy the data path of the UE to a switch or router near a specific data center so that the UE can access the data center more quickly, or it is possible to deploy a high-capacity switch or router for the data path of the UE so that the UE can exchange data with the data center at a higher speed.

Thereafter, the SCEF 1320 sends a response message to the SCS/AS 1325 or the third party 1325 at operation 1357. This response message may be a data relocation response. The response message may include an SCC/AS reference ID, a response reason, and CN node information.

The SCS/AS 1325 or the third party 1325 that receives the response transfers data partially to the SCEF 1320 at operation 1361. This is an IP packet of data to be relocated, and thus may include an IP address of the UE.

At operation 1363, the SCEF 1320 may identify the IP of the UE and the IP of the data server through this packet, and check whether the connection is provided in its mobile communication network. At operation 1365, the SCEF 1320 may transfer the packet to the 3GPP network 1315. The SCEF 1320 may negotiate with a 3GPP network apparatus to establish the data path to the optimal location. In this case, the target 3GPP network apparatus may negotiate for at least one of a policy function, a session management function, and a mobility management function.

At operation 1367, the 3GPP network 1315 that authenticates the IP for the UE according to the negotiation with the SCEF establishes the optimal data path by considering the location of the UE and the location of the data server. That is, the optimal user plane function is selected to relocate the data session. Using the data path, the UE transmits and receives data.

At operation 1371, the SCS/AS 1325 or the third party 1325 may provide CN node information to the UE 1305.

At operation 1373, the UE 1305 may send a data request message to the 3GPP network 1315. The data request message may include information about the UE IP address. At operation 1375, the 3GPP network 1315 may perform authorization for the UE. Depending on the authorization result, the 3GPP network 1315 may send a data response message to the UE 1305 at operation 1377. The data response message may include relocation data.

The SCEF 1320 is an abbreviation of Service Capability Exposure Function, and refers to a network function of exposing a mobile communication network function and capability to the inside/outside and exchanging information.

Sixth Embodiment

The sixth embodiment of the present invention relates to a method for a UE to transmit and receive data by connecting to a plurality of third-party servers, and to an apparatus for performing the method.

In this embodiment of the present invention, CIoT represents an IoT service using a cellular network. The cellular network refers to a mobile communication network, including $2^{nd}$ generation (2G) represented by global system for mobile communication (GSM) enhanced data rates for GSM (EDGE) radio access network (GERAN), $3^{rd}$ generation (3G) represented by GPRS, and $4^{th}$ generation (4G) represented by LTE. The CIoT service refers to a cellular service for supporting an IoT device, and may refer to a service for transmitting a small amount of data through the cellular network. It may also include a machine type communication (MTC) service. The cellular network includes not only a radio access network but also a core network.

The embodiment of the present invention deals with the operations of a UE and a network apparatus for supporting IoT in the cellular network. Although the embodiment of the present invention is described on the basis of the LTE system defined by 3GPP, it may be similarly used throughout the wireless communication such as wireless local area network (WLAN) or Bluetooth. Proposed are in the present invention are a method and apparatus for exchanging relay-related information between a core network and a base station (or evolved Node B (eNB)) in order to support a UE-to-network relay function, which is one of proximity service (ProSe) functions for public safety, and a method and apparatus for controlling the UE to support the relay function at the base station.

An SCS/AS refers to a 3rd party application server.

An SCEF performs a function of connecting the SCS/AS and an EPS network and is located in a trusted domain.

The SCEF is connected to an HSS and receives information about the UE.

The SCEF may be connected with an MME through the HSS and exchange data.

There are a UE-MME connection, a MME-SCEF connection, and a SCEF-SCS/AS connection. Through these connections, data sent by the UE may be delivered to the SCS/AS, and data send by the SCS/AS may be delivered to the UE.

Therefore, a procedure of establishing the UE-MME connection, the MME-SCEF connection, and the SCEF-SCS/AS connection is required.

Sixth-First Embodiment

Figure 14:
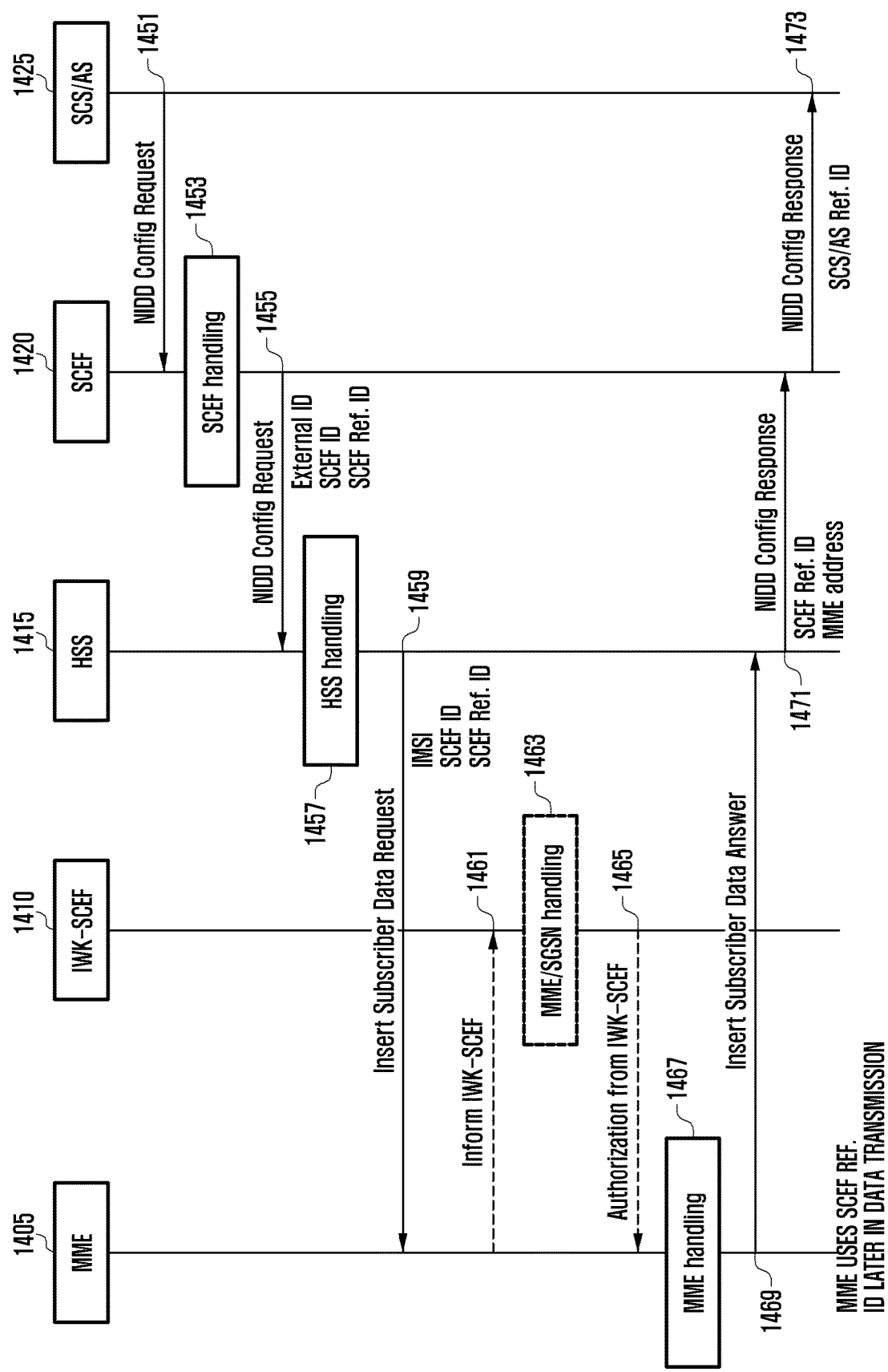
FIG. 14 is a diagram illustrating a configuration procedure for establishing a data connection between an SCS/AS, an SCEF, and an MME in an embodiment of the present invention.

FIG. 14 is a diagram illustrating a configuration procedure for establishing a data connection between an SCS/AS, an SCEF, and an MME in an embodiment of the present invention.

Referring to FIG. 14, a communication system of this embodiment may include an MME 1405, an IWK-SCEF 1410, an HSS 1415, an SCEF 1420, and an SCS/AS 1425.

At operation 1451, the SCS/AS may send a non-IP data delivery (NIDD) configuration request message to the SCEF 1420.

At operation 1453, the SCEF 1420 may store information received through the NIDD configuration request and verify the SCS/AS 1425.

At operation 1455, the SCEF may send the NIDD configuration request message to the HSS 1415. This message may include an external ID, an SCEF ID, and an SCEF reference ID.

At operation 1457, the HSS 1415 may verify the validity for data delivery by using the received NIDD configuration request message.

At operation 1459, the HSS 1415 sends an insert subscriber data request message to the MME 1405. This message may include an IMSI, the SCEF ID, and the SCEF reference ID.

If the MME 1405 is configured to use the IWK-SCEF 1410, the MME 1405 sends an inform IWK-SCEF message to the IWK SCEF 1410 at operation 1461.

At operation 1463, the IWK-SCEF 1410 may verify the request and notify a verification result.

If the verification is successful, the IWK-SCEF 1410 may send an authorization from IWK-SCEF message to the MME 1405 at operation 1465.

At operation 1467, the MME 1405 may verify the request.

At operation 1469, the MME 1405 may send an insert subscriber data answer message to the HSS 1415. The MME 1405 may use the SCEF reference ID later in data transmission.

At operation 1471, the HSS 1415 may send an NIDD configuration response message to the SCEF 1420. This message may include the SCEF reference ID and an MME address.

At operation 1473, the SCEF 1420 may send the NIDD configuration response message to the SCS/AS 1425. This message may include an SCS/AS reference ID.

Meanwhile, when multiple SCS/ASs are connected to a single UE at operations of FIG. 14, the SCEF creates one external ID or one SCEF reference ID per SCS/AS reference ID for the SCS/AS-SCEF-MME-UE connection.

Therefore, when multiple SCS/ASs are connected to the SCEF to establish a connection with a single UE, the SCEF is connected with the MME by using multiple SCEF reference IDs corresponding to multiple SCS/ASs. Thus, the MME has multiple SCEF reference IDs for a single UE.

In this case, when the MME receives data from the UE, it is necessary to know which SCEF reference ID will be used for delivering data to the SCEF. So, the SCEF can find a target SCS/AS corresponding to the SCEF reference ID and deliver data.

Proposed in the following embodiments is a method for the SCEF to deliver UE data (i.e., mobile originated) to a correct target SCS/AS when two or more SCS/ASs have data connections for a single UE via the SCEF.

Sixth-Second Embodiment

Figure 15:
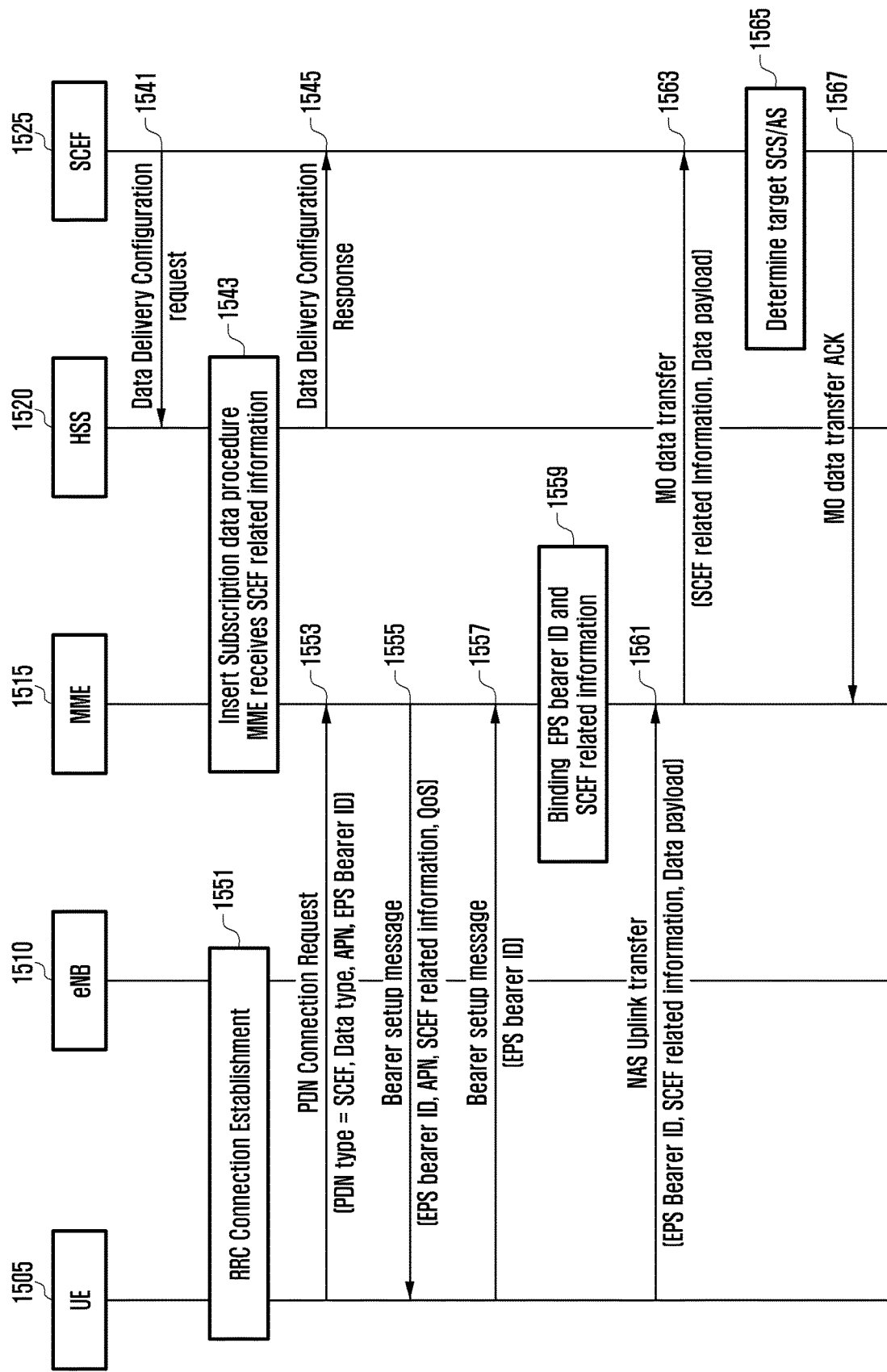
FIG. 15 is a diagram illustrating a method for utilizing an evolved packet system (EPS) bearer identification (ID) at a terminal and an MME in an embodiment of the present invention.

FIG. 15 is a diagram illustrating a method for utilizing an EPS bearer ID at a terminal and an MME in an embodiment of the present invention.

Referring to FIG. 15, a communication system of this embodiment may include a UE 1505, an eNB 1510, an MME 1515, an HSS 1520, and an SCEF 1525.

In this embodiment of FIG. 15, the SCEF 1525 may receive a data connection establishment request from a plurality of SCS/ASs. This is identified through an SCS/AS ID or an SCS/AS reference ID. The SCEF 1525 may allocate an SCEF reference ID per the SCS/AS ID or the SCS/AS reference ID. The SCEF 1525 that performs the above procedure delivers at least one of the SCS/AS ID, the SCS/AS reference ID, the SCEF ID, or the SCEF reference ID to the HSS 1520 at operation 1541, and the HSS 1520 stores it and may deliver it to the MME 1515 at operation 1543 (insert subscription data procedure). The insert subscription data procedure and data delivery configuration request/response may use those described in other embodiments.

In FIG. 15, a binding-related procedure may be performed immediately after receiving a packet data network (PDN) connection request message or immediately after sending a bearer setup message to the UE. The MME 1515 acquires information related to the SCEF through negotiation with the HSS 1520, and this is performed in the insert subscription data procedure. At operation 1545, the HSS 1520 sends a data delivery configuration response message to the SCEF 1525. Through the data delivery configuration request/response with the HSS, the SCEF 1525 knows which MME 1515 is serving the corresponding UE.

The information related to the SCEF may include at least one of the SCEF ID, the SCEF reference ID, the SCS/AS ID, the SCS/AS reference ID, and an external ID for the corresponding UE (IMSI).

At operation 1551, the UE 1505 establishes a radio resource control (RRC) connection with the eNB 1510 to send a message to the MME 1515.

At operation 1553, the UE 1505 transmits a PDN connection request message to the MME 1515 to establish a data delivery connection with the SCEF 1525.

The PDN connection request may include at least one of a PDN type=SCEF, a data type=IP, non-IP, or other data format, an access point name (APN)=an APN value indicating SCEF connection, and an EPS bearer ID=a bearer identifier to be used for SCEF connection by the UE. The APN may be omitted. The PDN type may be represented by IP, non-IP, SMS, or SCEF.

At operation 1559, the MME 1515 performs binding with the EPS bearer ID by using the SCEF-related information acquired from the HSS 1520.

Binding the SCEF reference ID and the EPS bearer ID.

The above binding may include binding with at least one of the SCS/AS ID, the SCS/AS reference ID, the SCEF ID, and the external ID which are received from the HSS.

Because of having this binding, the MME 1515 may identify the SCEF reference ID, the SCEF ID, etc. as to which SCEF connection is used for delivering data sent by the UE via a specific EPS bearer ID. Further, the MME may identify the SCS/AS ID, the SCS/AS reference ID, etc. as to which SCS/AS connection is used for data delivery, and deliver this to the SCEF together with data sent by the UE. The SCEF may identify a target SCS/AS from the received SCS/AS ID or SCS/AS reference ID and deliver data.

After binding, the MME 1515 transmits a bearer setup message to the UE 1505 at operation 1555 and establishes a bearer connection for an SCEF connection.

The bearer setup message may include at least one of the following information.

EPS bearer ID=An EPS bearer ID received from the UE or an EPS bearer ID newly assigned by the MME.

APN=An APN received from the UE or an APN specified by the MME. After receiving the APN, the UE may use it for delivering data of a specific application with a specific APN in the UE.

SCEF related Information=At least one of the SCEF reference ID or SCEF ID for identifying the SCEF connection, the SCS/AS reference ID or SCS/AS ID for identifying the SCS/AS connections, and the external ID for identifying the UE at the SCS/AS or SCEF may be included.

QoS=QoS is a value indicating the level of quality of service to be applied by the UE to send data through the SCEF connection, and may be a value indicating a connection priority, a maximum bitrate, a fixed bitrate, etc. of the established bearer.

At operation 1557, the UE 1505 that receives the bearer setup message can know that a connection for the SCEF is established with the EPS bearer ID, and completes the bearer connection establishment through the SCEF 1525 by sending a bearer setup complete message to the MME 1515.

Then, the UE 1505 can send data to the SCEF 1525 by using a corresponding bearer.

Data transmitted by the UE is referred to as mobile originated (MO) data. The UE 1505 may transmit data through a NAS message. The NAS message refers to a message exchanged between the UE 1505 and the MME 1515.

At operation 1561, the UE 1505 uses an uplink NAS transfer message to transmit MO data. This NAS message includes the following information.

EPS bearer ID: This is a value for identifying the MME-SCEF connectivity as to which SCEF is a target of data delivery from the MME.

SCEF related Information=At least one of the SCEF reference ID or SCEF ID for identifying the SCEF connection at the MME, the SCS/AS reference ID or SCS/AS ID for identifying the SCS/AS connections at the SCEF, and the external ID for identifying the UE at the SCS/AS or SCEF may be included.

Data payload: Actual data to be transmitted to the SCS/AS by the UE

Upon receipt of the message, the MME 1515 looks up the EPS bearer ID, finds binding information about which SCEF 1525 should be connected, and identifies the SCEF reference ID or SCEF ID. At operation 1563, the MME 1515 delivers the MO data to the corresponding SCEF 1525, and a message for delivering the MO data includes at least one of the following information.

SCEF related Information=At least one of 1) the SCS/AS reference ID or SCS/AS ID for identifying the SCS/AS connection, 2) the external ID for identifying the UE at the SCS/AS, and 3) the SCEF ID for indicating a source SCEF from which data is transmitted may be included.

Data payload: Actual data to be transmitted to the SCS/AS by the UE

At operation 1567, the SCEF 1525 may send, to the MME 1515, an ACK for indicating the completion of message reception. At operation 1565, the SCEF 1525 identifies a target SCS/AS through the received SCEF-related information. The SCEF 1525 delivers data received from the MME to the corresponding SCS/AS.

Sixth-Third Embodiment

Figure 16:
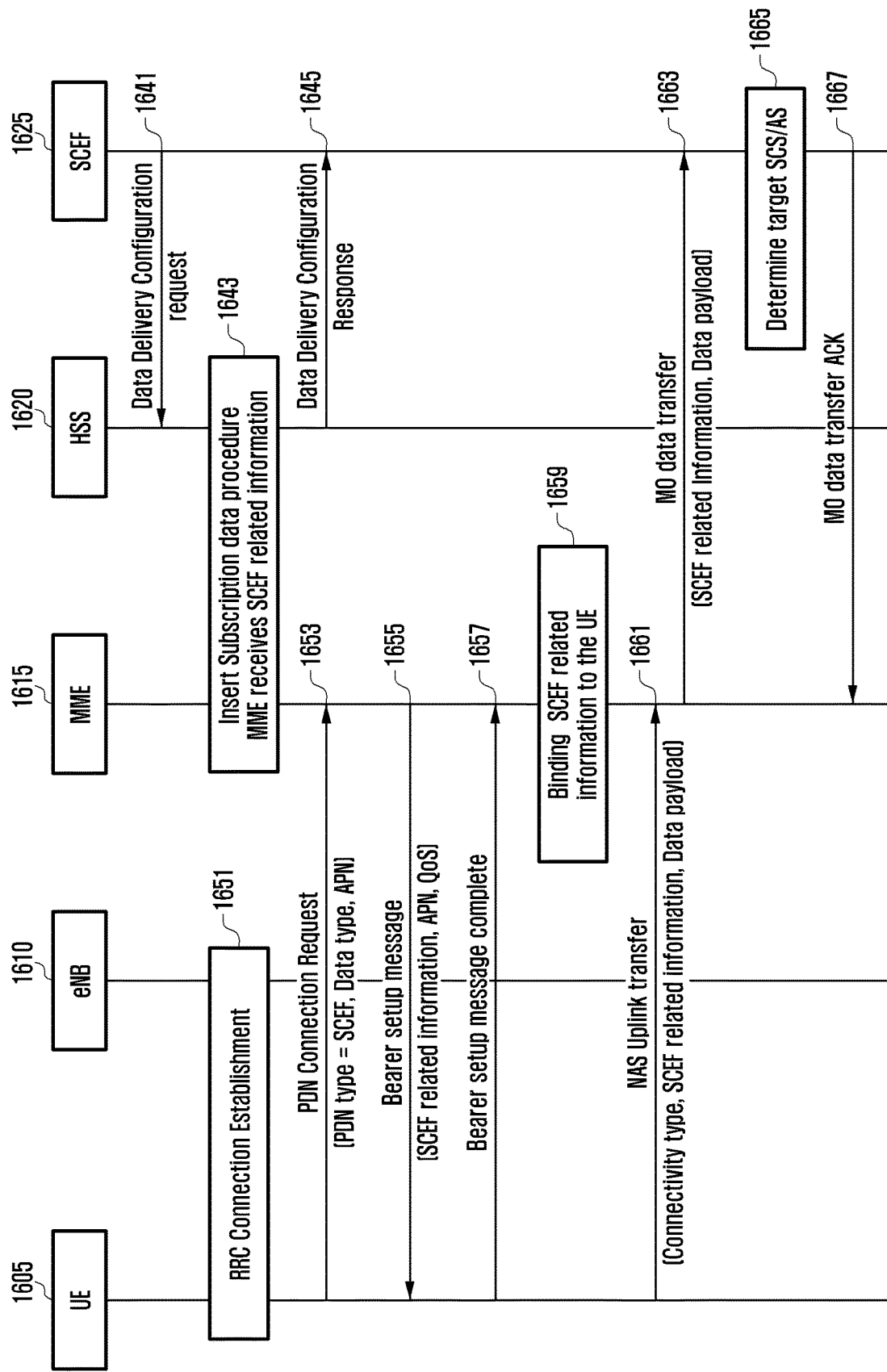
FIG. 16 is a diagram illustrating a method for utilizing a reference identifier of an SCEF or an identifier of an SCS/AS at a terminal in an embodiment of the present invention.

FIG. 16 is a diagram illustrating a method for utilizing a reference identifier of an SCEF or an identifier of an SCS/AS at a terminal in an embodiment of the present invention.

Referring to FIG. 16, a communication system of this embodiment may include a UE 1605, an eNB 1610, an MME 1615, an HSS 1620, and an SCEF 1625.

In this embodiment of FIG. 16, the SCEF 1625 may receive a data connection establishment request from a plurality of SCS/ASs. This is identified through an SCS/AS ID or an SCS/AS reference ID. The SCEF 1625 may allocate an SCEF reference ID per the SCS/AS ID or the SCS/AS reference ID. The SCEF 1625 that performs the above procedure delivers at least one of the SCS/AS ID, the SCS/AS reference ID, the SCEF ID, or the SCEF reference ID to the HSS 1620 at operation 1641, and the HSS 1620 stores it and may deliver it to the MME 1615 at operation 1643 (insert subscription data procedure).

Contrary to the sixth-second embodiment, the sixth-third embodiment has no procedure of allocating the EPS bearer ID.

At operation 1651, the UE 1605 establishes an RRC connection with the eNB 1610 to send a message to the MME 1615.

At operation 1653, the UE 1605 transmits a PDN connection request to the MME 1615 to establish a data delivery connection with the SCEF 1625.

The PDN connection request may include at least one of a PDN type=SCEF, a data type=IP, non-IP, or other data format, and an access point name (APN)=an APN value indicating SCEF connection. The APN may be omitted. The PDN type may be represented by IP, non-IP, SMS, or SCEF.

At operation 1659, the MME 1615 performs binding with a UE identifier (e.g., IMSI) by using the SCEF-related information acquired from the HSS 1620.

Binding the SCEF reference ID and the UE identifier: It is possible to know which SCEF reference ID is associated with the UE.

The above binding may include binding with at least one of the SCS/AS ID, the SCS/AS reference ID, the SCEF ID, and the external ID which are received from the HSS.

Because of having this binding, the MME may identify, based on the UE identifier, the SCEF reference ID, the SCEF ID, etc. as to which SCEF connection is used for delivering data sent by the UE. Further, the MME may identify the SCS/AS ID, the SCS/AS reference ID, etc. as to which SCS/AS connection is used for data delivery, and deliver this to the SCEF together with data sent by the UE. The SCEF may identify a target SCS/AS from the received SCS/AS ID or SCS/AS reference ID and deliver data.

After binding, the MME 1615 transmits a bearer setup message to the UE 1605 at operation 1655 and informs information about a bearer connection for an SCEF connection.

The bearer setup message may include at least one of the following information.

APN=An APN received from the UE or an APN specified by the MME. After receiving the APN, the UE may use it for delivering data of a specific application with a specific APN in the UE.

SCEF related Information=At least one of 1) the SCEF reference ID or SCEF ID for identifying the SCEF connection at the MME, 2) the SCS/AS reference ID or SCS/AS ID for identifying the SCS/AS connections at the SCEF, and 3) the external ID for identifying the UE at the SCS/AS or SCEF may be included.

QoS=QoS is a value indicating the level of quality of service to be applied by the UE to send data through the SCEF connection, and may be a value indicating a connection priority, a maximum bitrate, a fixed bitrate, etc. of the established bearer.

The UE 1605 that receives the bearer setup message can know that a connection for the SCEF is established with the SCEF-related information, and completes the bearer connection establishment through the SCEF 1625 by sending a bearer setup complete message to the MME 1615.

Then, the UE 1605 can send data to the SCEF 1625 by using a corresponding bearer. Since there is no bearer identifier, the UE 1605 should include an identifier indicating the SCEF connection in the message. Through this identifier, the MME 1615 can know the data to be transmitted to the SCEF.

Data transmitted by the UE is referred to as mobile originated (MO) data.

The UE may transmit data through a NAS message. The NAS message refers to a message exchanged between the UE 1605 and the MME 1615.

At operation 1661, the UE 1605 uses an uplink NAS transfer message to transmit MO data. This NAS message includes the following information.

Connectivity type: This indicates that data is delivered via the SCEF connection. Through this, the MME may know that a message includes data to be delivered to the SCEF.

SCEF related Information=At least one of the SCEF reference ID or SCEF ID for identifying the SCEF connection at the MME, the SCS/AS reference ID or SCS/AS ID for identifying the SCS/AS connections at the SCEF, and the external ID for identifying the UE at the SCS/AS or SCEF may be included.

Data payload: Actual data to be transmitted to the SCS/AS by the UE

Upon receipt of the message, the MME 1615 looks up the connectivity type and knows that a message is for data to be connected with the SCEF. Also, the MME looks up the UE identifier (e.g., IMSI), finds binding information about which SCEF should be connected, and identifies the SCEF reference ID or SCEF ID. Also, the MME looks up the SCEF-related information sent by the UE 1605 and identifies the target SCEF reference ID or SCEF ID. At operation 1663, the MME 1615 delivers the MO data to the corresponding SCEF, and a message for delivering the MO data includes at least one of the following information.

SCEF related Information=At least one of 1) the SCS/AS reference ID or SCS/AS ID for identifying the SCS/AS connection, 2) the external ID for identifying the UE at the SCS/AS, and 3) the SCEF ID for indicating a source SCEF from which data is transmitted may be included.

This information may include information in the NAS message received from the UE by the MME.

Data payload: Actual data to be transmitted to the SCS/AS by the UE

At operation 1667, the SCEF 1625 may send, to the MME 1615, an ACK for indicating the completion of message reception. At operation 1665, the SCEF 1625 identifies a target SCS/AS through the received SCEF-related information. The SCEF 1625 delivers data received from the MME 1615 to the corresponding SCS/AS.

Sixth-Fourth Embodiment

The sixth-fourth embodiment is similar to the sixth-third embodiment, and is different in the procedure of transmitting the MO data at the UE.

A data payload transmitted to the SCEF by the UE includes the SCEF reference ID or the SCS/AS ID. The MME looks up the UE identifier (e.g., IMSI) and thereby identifies the SCEF reference ID connected to the UE. Then, based on the SCEF reference ID, the MME delivers data received from the UE. The SCEF identifies the SCEF reference ID or the SCS/AS ID in the data payload and delivers the received data to the target SCS/AS.

Sixth-Fifth Embodiment

In the sixth-fifth embodiment of the present invention, when the SCEF has connections with a plurality of SCS/ASs, the SCEF establishes a connection with the MME, using one SCEF reference ID, by binding one SCEF reference ID for a plurality of SCS/AS reference IDs.

The SCEF acquires the MSISDN of the UE when negotiating with the HSS, and can uniquely identify the UE.

Also, the SCS/AS may uniquely identify the UE by using a unique value of the external ID. Therefore, the SCEF may always identify the identical UE through the external ID received from the SCS/AS. In this case, the external ID may be MSISDN.

The SCEF may receive a data connection establishment request from multiple SCS/ASs. This may be identified from the SCS/AS ID or the SCS/AS reference ID. The SCEF may allocate one SCEF reference ID for all the SCS/AS IDs or the SCS/AS reference IDs. The SCEF may deliver the SCEF reference ID to the HSS when negotiating with the HSS, and the HSS may store it and then deliver it to the MME. At this time, the SCEF ID or address of the corresponding SCEF may be delivered. This is used by the MME to connect with the SCEF. Therefore, the MME stores one SCEF reference ID. The SCEF stores one SCEF reference ID bound with several SCS/AS reference IDs. Therefore, the MME knows one SCEF reference ID only, and may perform binding of one SCEF reference ID only for one UE when establishing an SCEF data delivery connection between the UE and the MME.

The SCEF data delivery establishment procedure between the UE and the MME is the same as that in the sixth-third embodiment.

A difference is to be able to include the following information in the uplink NAS transfer message when the UE sends MO data.

Connectivity type=To identify a message for transmitting data to the SCEF

Data payload=Data to be sent to a target SCS/AS, and identifier information for the target SCS/AS The MME may identify the SCEF reference ID associated with the UE identifier (IMSI), and delivers, to the corresponding SCEF, data received from the UE. The SCEF may look up data received from the MME and thereby grasp identifier information for the target SCS/AS. The identifier information for the target SCS/AS may be expressed as an SCS/AS fully qualified domain name (FQDN), an SCS/AS ID, an IP Address, and the like.

The UE may acquire the identifier information for the target SCS/AS from a specific application, or utilize information configured in the UE.

Sixth-Sixth Embodiment

The sixth-sixth embodiment of the present invention relates to a message configuration method when the UE desires to send data to the SCEF.

When the UE desires to send data to the SCEF, a message format complying between the UE and the SCEF may be used. This may be referred to as a small data transmission protocol.

This message format should include at least one of the following information.

SCEF reference ID: To identify the connection between the MME and the SCEF, or to identify the connection between the SCEF and the SCS/AS.

SCS/AS ID: An identity for identifying the target SCS/AS at the SCEF.

SCS/AS reference ID: An identity for identifying the target SCS/AS at the SCEF.

External ID: An identity for identifying the UE at the target SCS/AS, or an identity for identifying the UE at the SCEF.

In addition, a cause may be included. This indicates, when data transmission fails, a reason for the failure and an entity from which the failure occurs. The UE, the MME, or the SCEF may receive this and request to reestablish the connection of the specific entity. For example, the connection between the UE and the MME may be reestablished, the connection between the MME and the SCEF may be reestablished, and the identifiers for the connection between the UE and the SCEF may be reallocated and exchanged.

Seventh Embodiment

The seventh embodiment of the present invention relates to a bearer management method when a cellular IoT UE uses a telephone service, and to an apparatus for performing the method.

In this disclosure, an EPS refers to an evolved packet system or an LTE network. The EPS is composed of evolved universal terrestrial radio access network (E-UTRAN) between the UE and the eNB, and an evolved packet core (EPC) which is a core network of the LTE system. The EPC is composed of an MME, a serving gateway (S-GW), a PDN gateway (P-GW), and a PCRF.

In this disclosure, CIoT represents an IoT service using a cellular network. The cellular network refers to a mobile communication network, including 2G represented by GERAN, 3G represented by GPRS, and 4G represented by LTE. The CIoT service refers to a cellular service for supporting an Internet of Things (IoT) device, and may refer to a service for transmitting a small amount of data through the cellular network. It may also include a machine type communication (MTC) service. The cellular network includes not only a radio access network but also a core network.

For the CIoT, the existing network apparatus may be changed. For example, there may be a CIoT-dedicated base station (eNB), and a CIoT function may be added to the existing base station (eNB). In the present invention, such base stations (eNBs) will be referred to as a CIoT RAN for convenience. However, the present invention is not limited to this term, and other terms having equivalent technical meanings may be used. Similarly, a core network of the cellular network may exist for the CIoT. In the present invention, a core network entity for the CIoT will be referred to as a CIoT core network (CN) node. Although this is currently referred to as C-SGN in 3GPP, the present invention is not limited to this term, and other terms having equivalent technical meaning may be used. The CIoT CN node refers to an entity including the functions of the MME and a serving gateway in the current LTE system and may be an entity including the function of a PDN gateway. Thus, in the present invention, the C-SGN may refer to the MME.

The CIoT CN node not only performs the context management, mobility management, and signaling session management of the CIoT UE, but also delivers data of the UE to an application server or delivers data received from the application server to the UE. That is, the CIoT CN node provides a gateway function to the CIoT UE, and may serve as a gateway for receiving data from the CIoT RAN and routing it to the application server. If the CIoT CN node includes the PDN Gateway function, the CIoT CN node may directly transfer user plane data to the application server.

The CIoT UE infrequently transmits and receives small data. Therefore, without establishing a user plane connection between the CIoT UE and the CIoT CN node, only a control plane connection may be established to transmit the user plane data therethrough. As a result, by omitting the user plane connection establishment, a user plane encryption operation, or a control information signaling procedure for the user plane connection establishment, the efficiency may be obtained at the radio resources and the network. This scheme will be referred to as a control plane (CP) based solution for the sake of convenience.

Unlike the above, the CIoT UE may establish a user plane connection and perform a small data transmission. The CIoT UE establishes an RRC connection with the CIoT RAN, and the CIoT RAN establishes a user plane bearer connection with the C-SGN through signaling. The CIoT UE establishes a data radio bearer (DRB) connection with the CIoT RAN, and the CIoT RAN establishes a user plane bearer connection with the C-SGN. Therefore, data transmitted by the CIoT UE is transferred via the user plane as in a conventional transmission scheme of the LTE UE. For convenience, this will be referred to as a user plane (UP) based solution in this disclosure.

Figure 17:
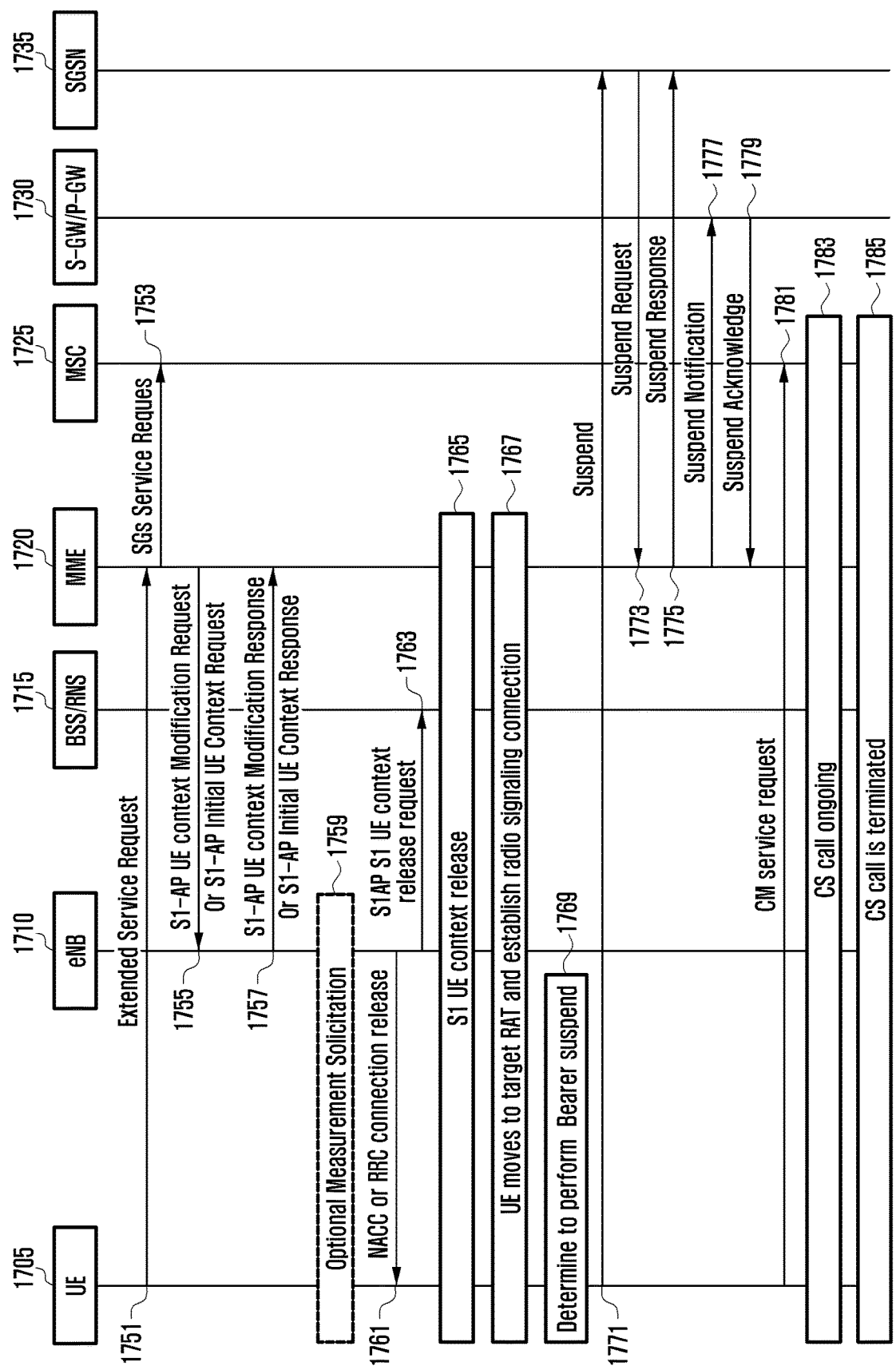
FIG. 17 is a diagram illustrating an MO-based bearer management method in an embodiment of the present invention.

FIG. 17 is a diagram illustrating an MO-based bearer management method in an embodiment of the present invention.

Referring to FIG. 17, a communication system of this embodiment may include a UE 1705, an eNB 1710, a BSS/RNS 1715, an MME 1720, an MSC 1725, an S-GW/P-GW 1730, and an SGSN 1735.

At operation 1751, the UE 1705 may send an extended service request message to the MME 1720. At operation 1753, the MME may send an SGs service request message to the MSC 1725.

At operation 1755, the MME 1715 may transmit an S1-AP UE context modification request message or an S1-AP initial UE context request message to the eNB 1710.

At operation 1757, the eNB 1710 may transmit the S1-AP UE context modification response message or the S1-AP initial UE context response message to the MME 1715.

At operation 1759, the eNB 1710 may acquire measurement information from the UE 1705.

At operation 1761, the eNB 1710 may transmit an NACC connection release message or an RRC connection release message to the UE 1705.

At operation 1763, the eNB 1710 may transmit an S1-AP UE context release request message to the BSS/RNS 1715.

At operation 1765, the MME 1720 may release UE context of the eNB 1710. At operation 1767, the UE 1705 moves to the target RAT and establishes a radio signaling connection.

If PS handover is supported, a handover procedure is performed instead of the operations 1763 and 1765. Therefore, a packet switched (PS) service may be continuously used at the target RAT that uses circuit switched (CS).

At operation 1769, the UE 1705 determines whether to suspend a bearer.

When the UE moves to the target RAT instead of LTE to use circuit switched fall back (CSFB), the UE may temporarily suspend the bearer in preparation for returning to the LTE network after using a telephone service. If the UE is using the CIoT service in LTE, the UE may have a CP-based data transmission bearer for transmitting data through the control plane. In this case, since there is no user plane bearer among the UE, the eNB and the gateway, the bearer suspend procedure may not be performed.

If the UE has at least one CP-based data transmission bearer and at least one UP-based data transmission bearer, the UE may insert an identifier of the UP-based data transmission bearer in a bearer suspend request message of operation 1771 in order to suspend only the UP-based data transmission bearer. Alternatively, even though the UE does not insert the ID of the UP-based data transmission bearer, the SGSN 1735 that receives this message may perform operation 1773 to suspend only the UP-based data transmission bearer.

At the operation 1773, the MME 1720 that receives the message may grasp the CP-based data transmission bearer and the UP-based data transmission bearer which have been possessed by the UE 1705, determine to suspend only the UP-based data transmission bearer, and exchange messages with the S-GW/P-GW at operations 1777 and 1779.

If the UE has at least one CP-based data transmission bearer, the bearer suspend procedure may not be performed even though there is the UP-based data transmission bearer. As a result, all the UP-based data transmission bearers are released, and only information about the CP-based data transmission bearer remains between the UE and the MME when the UE completes a CS service and returns to the LTE network. Alternatively, even if the UE has only the CP-based data transmission bearer, the bearer suspend procedure may be performed.

If the UE has used the CP-based data transmission bearer, the MME 1720 confirms that the UE has used the CP-based data transmission bearer, and sends a suspend notification to the S-GW 1730 through the S11 interface at operation 1777 in order to suspend the CP-based data transmission bearer. Passing through the S11 interface means the CP-based data transmission bearer. The MME 1720 may insert an indication (i.e., EPS bearer ID, etc.) indicating the CIoT control plane optimization in the suspend notification to be sent to the S-GW 1730. The S-GW 1730 that receives the suspend notification suspends the bearer for the CIoT control plane optimization between the S-GW 1730 and the MME 1720.

Or, if the MME 1720 determines that the UE has only the CP-based data transmission bearer, the MME 1720 may process the bearer in a suspend state therein without requesting the bearer suspend to the S-GW 1730. When the UE returns to the MME 1720 again, the MME 1720 may activate again and use the bearer context of the suspended bearer. Therefore, the MME 1720 does not interact with the S-GW 1730 in the suspend operation and the reactivation operation.

Or, if the UE has also the UP-based data transmission bearer, the MME 1720 may suspend only a default bearer among UP-based data transmission bearers. This may occur in parallel with the operation of suspending the CP-based data transmission bearer, or occur only for the UP-based data transmission bearer without suspending the CP-based data transmission bearer.

At operation 1781, the UE 1705 may transmit a CM service request message to the MSC 1725. This message may include information indicating an MO call by the CSFB.

At operation 1783, the UE 1705 may use a CS call. At operation 1785, the CS call may be terminated.

Figure 18:
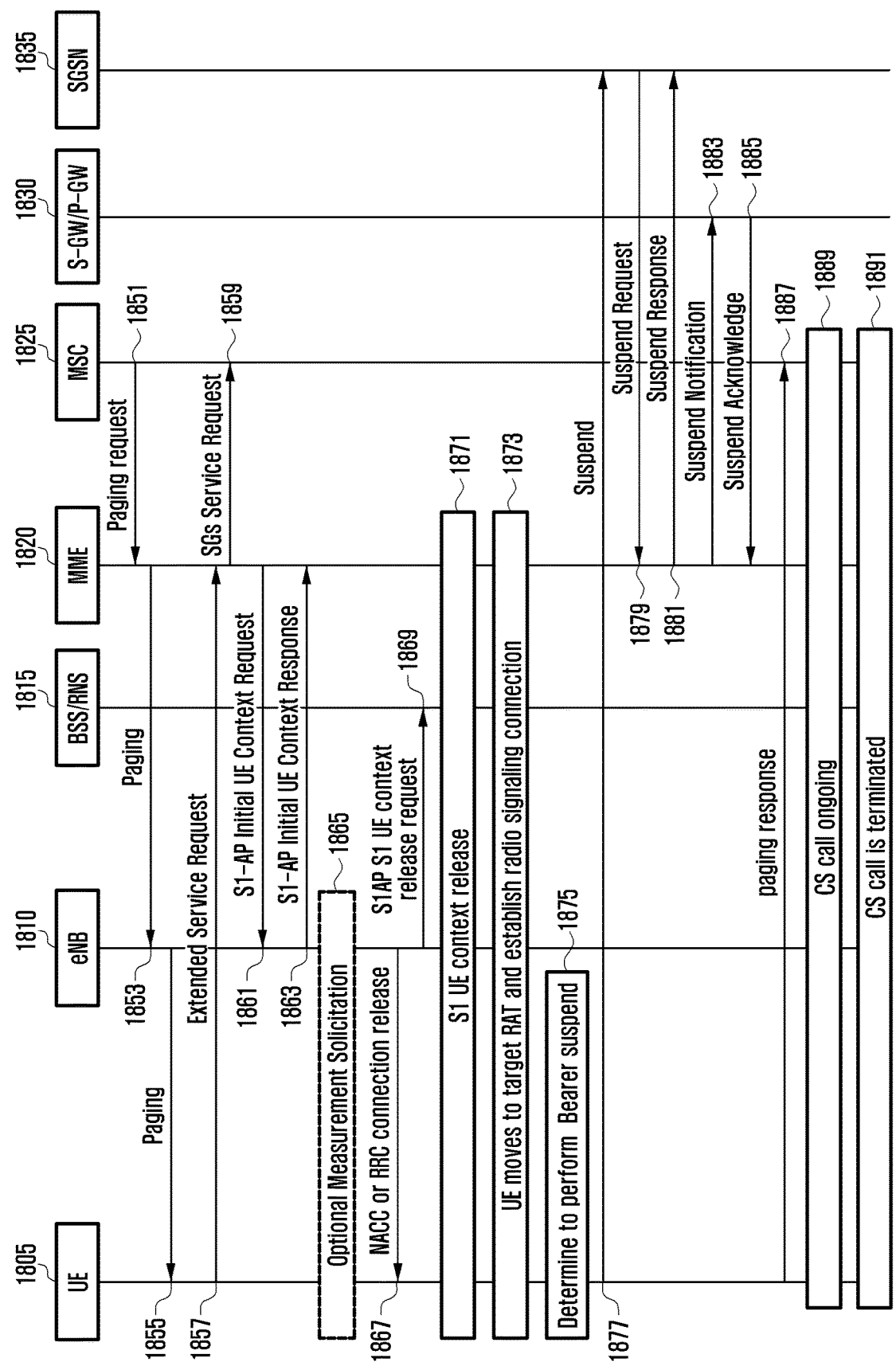
FIG. 18 is a diagram illustrating an MT-based bearer management method in an embodiment of the present invention.

FIG. 18 is a diagram illustrating an MT-based bearer management method in an embodiment of the present invention.

Referring to FIG. 18, a communication system of this embodiment may include a UE 1805, an eNB 1810, a BSS/RNS 1815, an MME 1820, an MSC 1825, an S-GW/P-GW 1830, and an SGSN 1835.

At operation 1851, the MSC 1825 receives an incoming voice call and sends a paging request message to the MME 1820. At operation 1853, the MME 1820 sends the paging request message to the eNB 1810. At operation 1855, the eNB 1810 performs a paging operation for the UE 1805. The eNB 1810 may send a paging message to the UE 1805.

At operation 1857, the UE 1805 may send an extended service request message to the MME 1820 for MT CS fall back. At operation 1859, the MME 1820 may send a SGs service request message to the MSC 1825, and inform the MSC 1825 that the UE 1805 is in a connected mode. Using this, the MSC 1825 may perform call forwarding to the UE 1805.

At operation 1861, the MME 1820 may send an S1-AP initial UE context request message to the eNB 1810. This message may include a CS fall back indicator and an LAI. This message may instruct the UE 1805 to move to universal terrestrial radio access network (UTRAN) or GERAN.

At operation 1863, the eNB 1810 may send the S1-AP initial UE context response message to the MME 1820.

At operation 1865, the eNB 1810 may receive measurement information from the UE 1805 and may use the measurement information for determining a target cell. The measurement information reception process may be omitted.

At operation 1867, the eNB 1810 may send an NACC connection release message or an RRC connection release message to the UE 1805.

At operation 1869, the eNB 1810 may send an S1-AP UE context release request message to the BSS/RNS 1815 and/or the MME 1820.

At operation 1871, the MME 1820 may release the UE context of the eNB 1810. At operation 1873, the UE 1805 moves to the target RAT and establishes a radio signaling connection.

If PS handover is supported, a handover procedure is performed instead of the operations 1871 and 1873. Therefore, the PS service may be continuously used at the target RAT that uses the CS.

When the UE moves to the target RAT instead of LTE in order to use the CSFB, the UE may temporarily suspend the bearer in preparation for returning to the LTE network after using a telephone service. If the UE is using the CIoT service in LTE, the UE may have a CP-based data transmission bearer for transmitting data through the control plane. In this case, since there is no user plane bearer among the UE, the eNB and the gateway, the bearer suspend procedure may not be performed.

At operation 1875, the UE 1805 may determine whether to suspend the bearer temporarily. If the UE 1805 has at least one CP-based data transmission bearer and at least one UP-based data transmission bearer, the UE 1805 may insert an identifier of the UP-based data transmission bearer in a bearer suspend request message at operation 1877 in order to suspend only the UP-based data transmission bearer. Alternatively, even though the UE 1805 does not insert the ID of the UP-based data transmission bearer, the SGSN 1835 that receives this message may perform operation 1879 to suspend only the UP-based data transmission bearer. Alternatively, the MME 1820 that receives the suspend request message of the operation 1879 may send a suspend response message to the SGSN. The MME 1820 may grasp the CP-based data transmission bearer and the UP-based data transmission bearer which have been possessed by the UE 1805, determine to suspend only the UP-based data transmission bearer, and exchange messages with the S-GW/P-GW 1830. The MME 1820 may send a suspend notification message to the S-GW/P-GW 1830 at operation 1883, and the S-GW/P-GW 1830 may send a suspend acknowledge message to the MME 1820 at operation 1885.

If the UE 1805 has at least one CP-based data transmission bearer, the bearer suspend procedure may not be performed even though there is the UP-based data transmission bearer. As a result, all the UP-based data transmission bearers are released, and only information about the CP-based data transmission bearer remains between the UE 1805 and the MME 1820 when the UE completes a CS service and returns to the LTE network.

Alternatively, even if the UE 1805 has only the CP-based data transmission bearer, the bearer suspend procedure may be performed.

If the UE1805 has used the CP-based data transmission bearer, the MME 1820 confirms that the UE has used the CP-based data transmission bearer, and sends a suspend notification to the S-GW through the S11 interface at operation 1883 in order to suspend the CP-based data transmission bearer. Passing through the S11 interface means the CP-based data transmission bearer. The MME 1820 may insert an indication (i.e., EPS bearer ID, etc.) indicating the CIoT control plane optimization in the suspend notification to be sent to the S-GW 1830. The S-GW 1830 that receives the suspend notification suspends the bearer for the CIoT control plane optimization between the S-GW 1830 and the MME 1820.

Or, if the MME 1820 determines that the UE 1805 has only the CP-based data transmission bearer, the MME 1820 may process the bearer in a suspend state therein without requesting the bearer suspend to the S-GW 1830. When the UE 1805 returns to the MME 1820 again, the MME 1820 may activate again and use the bearer context of the suspended bearer. Therefore, the MME does not interact with the S-GW in the suspend operation and the reactivation operation.

Or, if the UE 1805 has also the UP-based data transmission bearer, the MME 1820 may suspend only a default bearer among UP-based data transmission bearers. This may occur in parallel with the operation of suspending the CP-based data transmission bearer, or occur only for the UP-based data transmission bearer without suspending the CP-based data transmission bearer.

At operation 1887, the UE 1805 may send a paging response message to the MSC 1825.

At operation 1189, the UE 1805 may use a CS call. At operation 1891, the CS call may be terminated.

Figure 19:
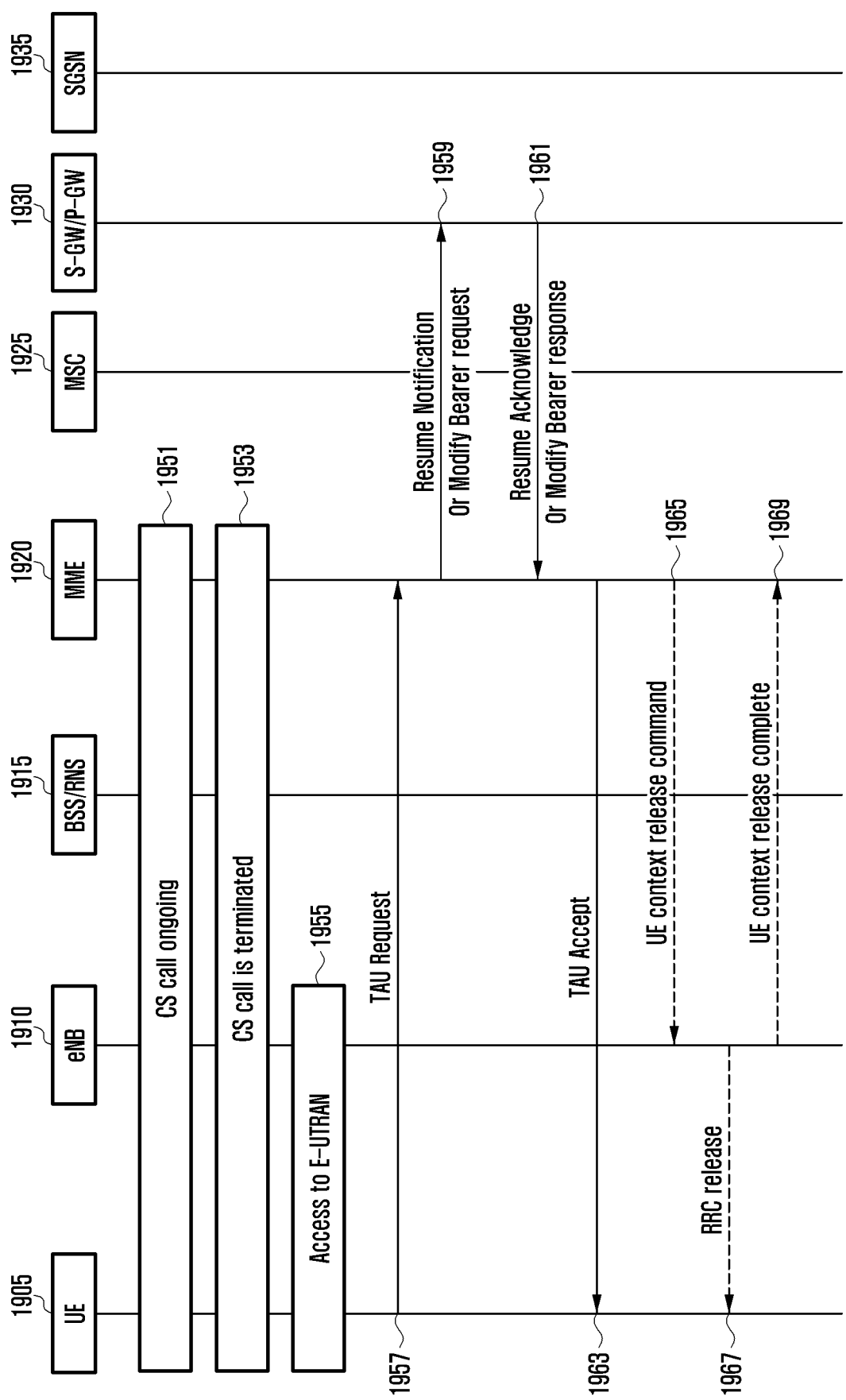
FIG. 19 is a diagram illustrating a procedure after a call is terminated in an embodiment of the present invention.

FIG. 19 is a diagram illustrating a procedure after a call is terminated in an embodiment of the present invention.

Referring to FIG. 19, a communication system of this embodiment may include a UE 1905, an eNB 1910, a BSS/RNS 1915, an MME 1920, an MSC 1925, an S-GW/P-GW 1930, and an SGSN 1935.

At operation 1951 the UE 1905 is using a CS call, and at operation 1953 the UE 1905 may terminate the CS call. When the CS call is terminated, the UE 1905 may access again E-UTRAN at operation 1955.

At operation 1957, the UE 1905 may send a tracking area update (TAU) request message to the MME 1920. When returning to the LTE network after CSFB, the UE 1905 may select whether to use CIoT control plane optimization, CIoT user plane optimization, or normal EPC. When sending the TAU request, the UE may insert an indication for the selection. At operation 1959, the MME 1920 may transmit a resume notification message or a modify bearer request message to the P-GW/S-GW 1930.

The MME 1920 looks up an indication for a CIoT function included in the TAU request, and when the UE 1905 intends to use the CIoT control plane optimization, the MME 1920 sends the modify bearer request including related bearer context to the S-GW 1930. The bearer context of this message includes an address (e.g., TEID) of the S11-U interface. This address is an address of the S-GW 1930 used for the CP-based data transmission bearer.

If the UE 1905 intends to use the CIoT control plane optimization, and if the UE 1905 does not have the UP-based data transmission bearer suspended to go to the CSFB, the UE 1905 may update the CP-based data transmission bearer information without performing the modify bearer request to the S-GW 1930.

The MME 1920 may send the modify bearer request for both the UP-based data transmission bearer and the CP-based data transmission bearer which are suspended by the UE. At this time, the bearer context of the modify bearer request message may include an S1-U interface address and an S11-U interface address. Based on the distinction between S1-U and S11-U, the S-GW 1930 may determine whether the bearer context is for the CP-based data transmission bearer or for the UP-based data transmission bearer.

The message transmitted at the operation 1959 may be a resume notification, and refers to a message that triggers an operation of updating the bearer connection information through the bearer context.

At operation 1961, the S-GW/P-GW 1930 may send a resume acknowledge message or a modify bearer response message to the MME 1920.

At operation 1963, the MME 1920 sends a TAU accept message to the UE 1905, and may insert information about the updated, available bearer context. For example, an EPS bearer ID and an identifier indicating whether the bearer is the CP-based data transmission bearer or the UP-based data transmission bearer may be inserted.

After completing TAU, the MME 1920 performs a release. At operation 1965, the MME 1920 may send a UE context release command message to the eNB 1910. At operation 1967, the eNB 1910 may send an RRC release message to the UE 1905. Thereafter, at operation 1969, the eNB 1910 may send a UE context release complete message to the MME 1920.

Figure 20:
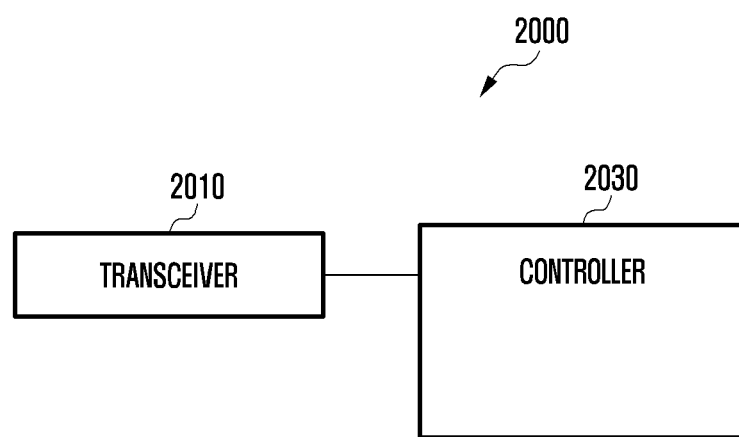
FIG. 20 is a diagram illustrating an AS according to an embodiment of the present invention.

FIG. 20 is a diagram illustrating an application server (AS) according to an embodiment of the present invention.

Referring to FIG. 20, the AS 2000 may include a transceiver 2010 for transmitting and/or receiving signals and a controller 2030 for controlling the operation of the AS 2000. The controller 2030 may include at least one processor. The controller 2030 may control the operations of the AS and SCS/AS described above in the first to seventh embodiments. A detailed operation of the controller 2030 refers to the operation of the AS in each embodiment.

Figure 21:
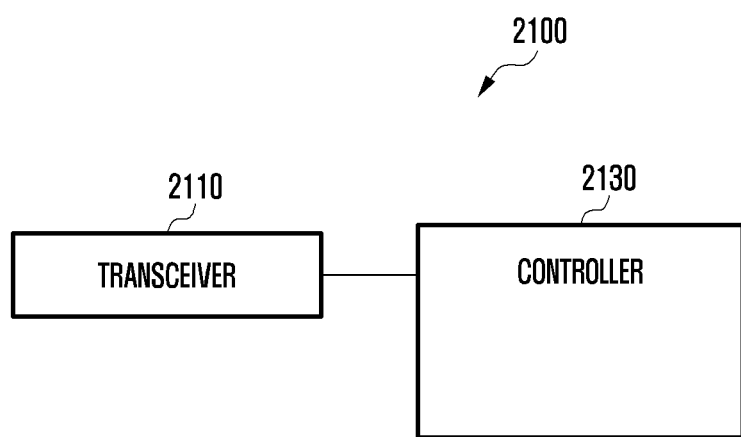
FIG. 21 is a diagram illustrating an SCEF according to an embodiment of the present invention.

FIG. 21 is a diagram illustrating an SCEF according to an embodiment of the present invention.

Referring to FIG. 21, the SCEF 2100 may include a transceiver 2110 for transmitting and/or receiving signals and a controller 2130 for controlling the operation of the SCEF 2100. The controller 2130 may include at least one processor. The controller 2130 may control the operation of the SCEF described above in the first to seventh embodiments. A detailed operation of the controller 2130 refers to the operation of the SCEF in each embodiment.

Figure 22:
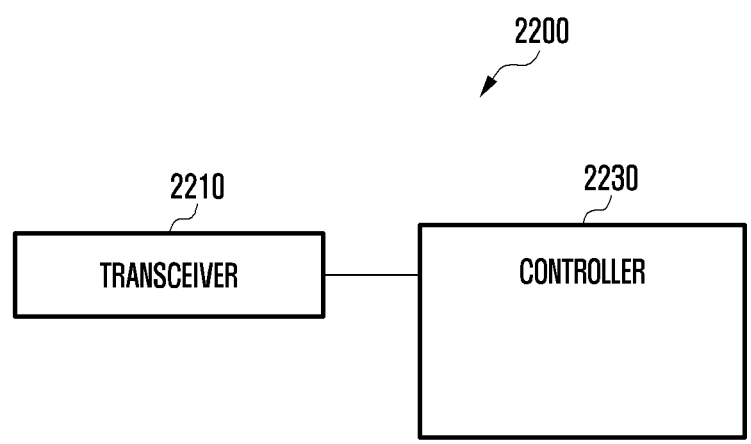
FIG. 22 is a diagram illustrating an HSS according to an embodiment of the present invention.

FIG. 22 is a diagram illustrating an HSS according to an embodiment of the present invention.

Referring to FIG. 22, the HSS 2200 may include a transceiver 2210 for transmitting and/or receiving signals and a controller 2230 for controlling the operation of the HSS 2200. The controller 2230 may include at least one processor. The controller 2230 may control the operation of the HSS described above in the first to seventh embodiments. A detailed operation of the controller 2020 refers to the operation of the HSS in each embodiment.

In embodiments of the present invention, each of a terminal (or UE), a base station (or eNB), an MME, and an SGSN may include a transceiver and a controller. Each of such entities may transmit and receive signals through the transceiver thereof. The controller of each entity may control the overall operation of each entity and may include at least one processor. In addition, the controller of the terminal may control the operation of the terminal described above in the first to seventh embodiments of the present invention, and the controller of the base station may control the operation of the base station described above in the first to seventh embodiments of the present invention. Also, the controller of the MME may control the operation of the MME described above in the first to seventh embodiments of the present invention, and the controller of the SGSN may control the operation of the SGSN described above in the first to seventh embodiments of the present invention. A detailed operation of the controller for controlling each entity refers to the operation of each entity in each embodiment.

It should be noted that the embodiments disclosed in this description and drawings are only illustrative examples of the present invention and are not intended to limit the scope of the present invention. Therefore, the scope of the present invention should be construed as including all the modifications or variations derived from the technical idea of the present invention in addition to the embodiments disclosed herein.

The invention claimed is:

1. A method performed by a first network entity, the method comprising:

transmitting, to a second network entity, a first message for a monitoring event, the first message including information on a monitoring duration and information on a guard time; and receiving, from the second network entity, a second message as a response to the first message, wherein the guard time indicates time value for which at least one monitoring event report detected for at least one terminal in a group is aggregated before transmitting the aggregated at least one monitoring event report, and wherein the time value of the guard time is less than the monitoring duration.

2. The method of claim 1, wherein the first message includes at least one of an identifier of the group of terminals, a monitoring type associated with the monitoring event, or a maximum number of reports.

3. The method of claim 1, wherein a timer corresponding to the information on the guard time is started in the second network entity, and wherein the timer is restarted when the timer expires.

4. The method of claim 1, wherein the second network entity corresponds to a mobility management function.

5. A method performed by a second network entity, the method comprising:

receiving, from a first network entity, a first message for a monitoring event, the first message including information on a monitoring duration and information on a guard time;

transmitting, to the first network entity, a second message as a response to the first message; and detecting at least one monitoring event based on the first message, wherein the guard time indicates time value for which at least one monitoring event report detected for at least one terminal in a group is aggregated before transmitting the aggregated at least one monitoring event report, and wherein the time value of the guard time is less than the monitoring duration.

6. The method of claim 5, wherein the first message includes at least one of an identifier of the group of terminals, a monitoring type associated with the monitoring event, or a maximum number of reports.

7. The method of claim 5,
wherein a timer corresponding to the information on the time is started in the second network entity, and
wherein the timer is restarted when the timer expires.

8. The method of claim 5, further comprising:
transmitting, to a third network entity, a third message including the aggregated at least one monitoring event report.

9. The method of claim 5, wherein the second network entity corresponds to a mobility management function.

10. A first network entity comprising:
a transceiver; and
a controller configured to:
   transmit, to a second network entity via the transceiver, a first message for a monitoring event, the first message including information on a monitoring duration and information on a guard time, and
   receive, from the second network entity via the transceiver, a second message as a response to the first message,
wherein the guard time indicates time value for which at least one monitoring event report detected for at least one terminal in a group is aggregated before transmitting the aggregated at least one monitoring event report, and
wherein the time value of the guard time is less than the monitoring duration.

11. The first network entity of claim 10, wherein the first message includes at least one of an identifier of the group of terminals, a monitoring type associated with the monitoring event, or a maximum number of reports.

12. The first network entity of claim 10,
wherein a timer corresponding to the information on the time is started in the second network entity, and
wherein the timer is restarted when the timer expires.

13. The first network entity of claim 10, wherein the second network entity corresponds to a mobility management function.

14. A second network entity comprising:
a transceiver; and
a controller configured to:
   receive, from a first network entity via the transceiver, a first message for a monitoring event, the first message including information on a monitoring duration and information on a guard time,
   transmit, to the first network entity via the transceiver, a second message as a response to the first message, and
   detect at least one monitoring event based on the first message,
wherein the guard time indicates time value for which at least one monitoring event report detected for at least one terminal in a group is aggregated before transmitting the aggregated at least one monitoring event report, and
wherein the time value of the guard time is less than the monitoring duration.

15. The second network entity of claim 14, wherein the first message includes at least one of an identifier of the group of terminals, a monitoring type associated with the monitoring event, or a maximum number of reports.

16. The second network entity of claim 14,
wherein a timer corresponding to the information on the time is started in the second network entity, and
wherein the timer is restarted when the timer expires.

17. The second network entity of claim 14, wherein the controller is further configured to transmitting, a third network entity, a third message including the aggregated at least one monitoring event report.

18. The second network entity of claim 14, wherein the second network entity corresponds to a mobility management function.

* * * * *